(12) United States Patent
Suzuki et al.

(10) Patent No.: US 8,736,926 B2
(45) Date of Patent: *May 27, 2014

(54) SHEET CONVEYANCE DEVICE, AND IMAGE FORMING APPARATUS AND IMAGE READING DEVICE INCLUDING SAME

(75) Inventors: Yoshito Suzuki, Kanagawa (JP); Hideki Tobinaga, Kanagawa (JP); Atsushi Kanaya, Kanagawa (JP); Shinya Kitaoka, Kanagawa (JP); Norio Kimura, Kanagawa (JP); Mamoru Kambayashi, Tokyo (JP); Michitaka Suzuki, Kanagawa (JP); Kenichiro Morita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 13/478,758

(22) Filed: May 23, 2012

(65) Prior Publication Data

US 2012/0314267 A1    Dec. 13, 2012

(30) Foreign Application Priority Data

Jun. 8, 2011 (JP) ................................. 2011-128610

(51) Int. Cl.
*H04N 1/04* (2006.01)

(52) U.S. Cl.
USPC .......... 358/498; 358/474; 358/497; 399/367; 271/265.01

(58) Field of Classification Search
CPC . H04N 1/12; H04N 1/00588; H04N 1/00745; H04N 1/00602; H04N 2201/04756; H04N 1/00748

USPC ........ 358/474, 498, 497, 496, 486; 271/3, 17, 271/265.01, 265.02, 259, 3.06, 3.09; 399/367, 372

See application file for complete search history.

(56) References Cited

U.S. PATENT DOCUMENTS

| | | | |
|---|---|---|---|
| 6,794,633 B2 * | 9/2004 | Iwasaki | 250/221 |
| 7,324,781 B2 * | 1/2008 | Nose et al. | 399/367 |
| 7,460,825 B2 * | 12/2008 | Sawanaka et al. | 399/371 |
| 7,577,392 B2 * | 8/2009 | Magata et al. | 399/367 |
| 7,577,396 B2 * | 8/2009 | Kitano | 399/405 |
| 7,722,036 B2 * | 5/2010 | Saitsu | 271/270 |
| 7,755,815 B2 * | 7/2010 | Nakamura et al. | 358/498 |

(Continued)

FOREIGN PATENT DOCUMENTS

JP    2005-324872 A    11/2005

*Primary Examiner* — Negussie Worku

(74) *Attorney, Agent, or Firm* — Harness, Dickey & Pierce, P.L.C.

(57) ABSTRACT

A sheet conveyance device includes a loading section, a sheet feeding unit, a separation section disposed downstream in a sheet conveyance direction from the sheet feeding unit, a conveyance member to transport a sheet separated by the separation section, a trailing-edge detector disposed at a first conveyance distance (L1) downstream from a separation position (Ab) and including a rotary follower and a rotation detector, a first leading-edge detector disposed downstream from the trailing-edge detector, and a controller. The trailing-edge detector A detects a sheet length in the sheet conveyance direction. The controller causes the sheet feeding unit to start sheet feeding in response to detection of the leading edge of the sheet by the first leading-edge detector when the detected sheet length equals a predetermined reference length and in other cases in response to detection of the trailing edge of the sheet by the trailing-edge detector.

16 Claims, 14 Drawing Sheets

(56) References Cited

U.S. PATENT DOCUMENTS

| | | | |
|---|---|---|---|
| 7,869,755 B2* | 1/2011 | Sano et al. | 399/367 |
| 7,924,475 B2* | 4/2011 | Suzuki | 358/474 |
| 7,934,722 B2* | 5/2011 | Namikawa | 271/265.04 |
| 7,957,042 B2* | 6/2011 | Onodera | 358/498 |
| 8,002,277 B2* | 8/2011 | Kyuken et al. | 271/262 |
| 8,014,042 B2* | 9/2011 | Magata | 358/474 |
| 8,104,765 B2* | 1/2012 | Tsuchiya et al. | 271/270 |
| 8,177,225 B2* | 5/2012 | Tokutsu | 271/186 |
| 8,264,752 B2* | 9/2012 | Katsuyama | 358/498 |
| 8,325,391 B2* | 12/2012 | Yamasaki | 358/474 |
| 8,363,290 B2* | 1/2013 | Shinno et al. | 358/498 |
| 8,444,135 B2* | 5/2013 | Morita et al. | 271/3.17 |
| 2012/0119436 A1 | 5/2012 | Morita et al. | |

* cited by examiner

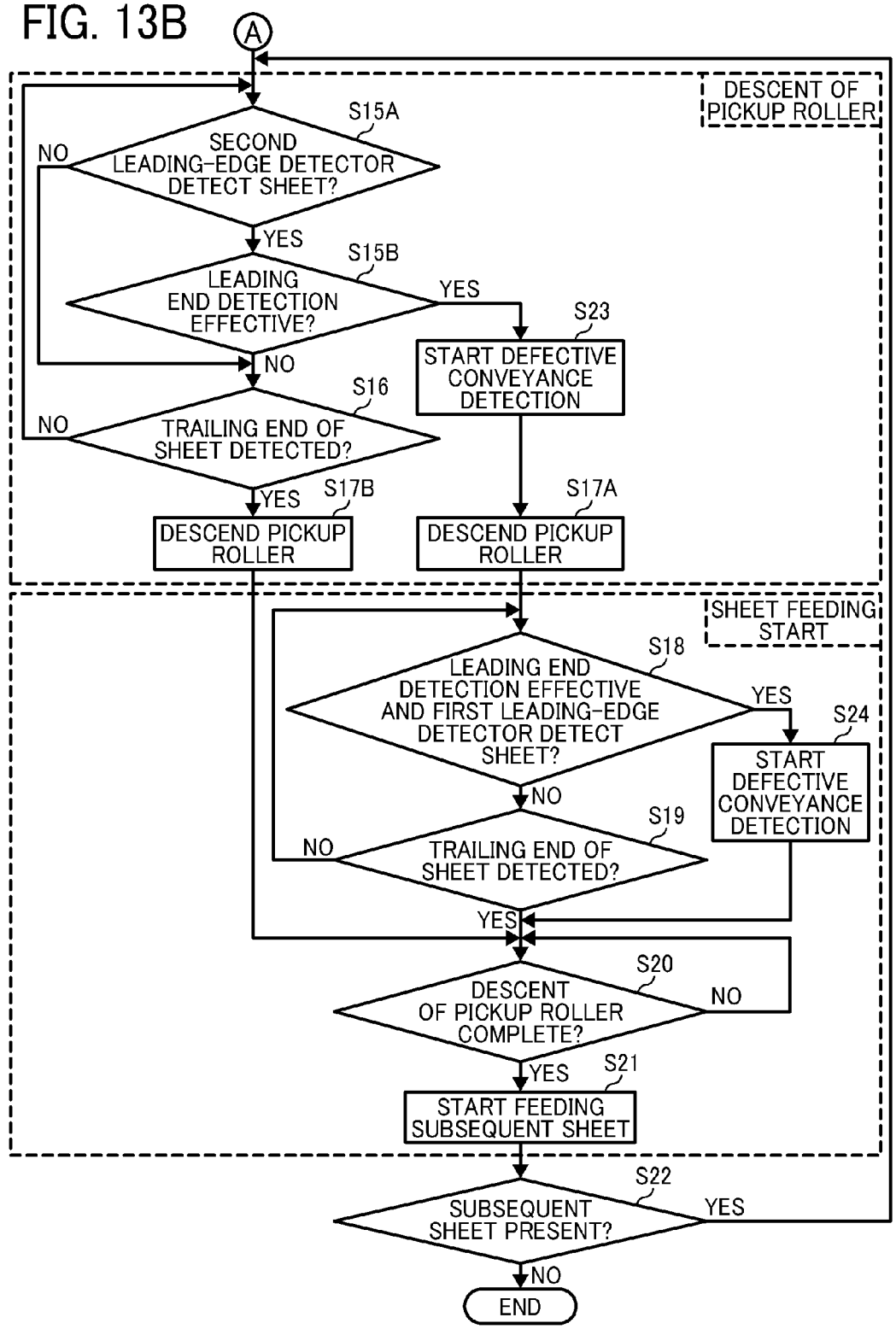

SHEET CONVEYANCE DEVICE, AND IMAGE FORMING APPARATUS AND IMAGE READING DEVICE INCLUDING SAME

CROSS-REFERENCE TO RELATED APPLICATION

This patent application is based on and claims priority pursuant to 35 U.S.C. §119 to Japanese Patent Application No. 2011-128610, filed on Jun. 8, 2011, in the Japan Patent Office, the entire disclosure of which is hereby incorporated by reference herein.

FIELD OF THE INVENTION

The present invention generally relates to a sheet-through type image reading device, an image forming apparatus to form an image on a sheet of recording media being transported, and a sheet conveyance device therefor.

BACKGROUND OF THE INVENTION

There are image reading devices that include a sheet conveyance device to separate and transport originals placed on a document table one at a time consecutively and an image reading unit to read images of the originals. In such image reading devices, it is preferred to reduce intervals between the originals (hereinafter also "sheets") to shorten reading time. Similarly, in image forming apparatuses that form images on sheets that are transported consecutively from a sheet tray one at a time, it is preferred to reduce intervals between sheets to shorten printing time.

Therefore, detectors (hereinafter "trailing-edge detectors") are used to ascertain when the sheet conveyed from the document table or sheet tray exits from the separator. However, it is difficult to timely recognize the timing at which the sheet exits from the separator from the following factors. The separator separates a single sheet from a bundle of sheets placed on the document table to prevent multiple sheets from being transported together at a time, which is a phenomenon generally called "multifeed". When multiple sheets enter a separating position with their leading-end portions superimposed one on another, the separator returns the subsequent sheets to the document table while transporting only the top sheet in a sheet conveyance direction. Thus, only the top sheet can be discharged by the separator. To minimize intervals between sheets, it is preferred that the subsequent sheet be sent out immediately after the trailing edge of the preceding sheet exits from the separator. More specifically, the separator typically includes a belt-shaped or roller-shaped conveyance member to transport the sheet in the sheet conveyance direction and a reverse roller pressed against the conveyance member, thus together forming a separation nip. The top sheet is separated from the rest in the separation nip, and the reverse roller returns the rest to the document table. Above and beneath the downstream end (i.e., exit) of the separation nip in the sheet conveyance direction, curved surfaces of the conveyance member and the reverse roller, projecting in the sheet conveyance direction, are present. In this configuration, the trailing-edge detector is disposed at a distance from the exit of the separation nip not at the same position as the exit of the separation nip. Consequently, it is inevitable that feeding the subsequent sheet is triggered by detection of the trailing edge of the preceding sheet that has been transported a given distance from the separation nip, inhibiting reduction in intervals between sheets.

Intervals between sheets may be reduced by increasing a conveyance velocity at which sheets are transported from the document table or sheet tray to the reading position or image forming position from a velocity at which the sheet passes through the image reading position or image formation position. Although this approach is effective to some extent, image reading velocity or image formation velocity has become faster owing to progress in technology, and it is difficult to increase the conveyance velocity as described above.

BRIEF SUMMARY OF THE INVENTION

In view of the foregoing, one embodiment of the present invention provides a sheet conveyance device that includes a loading section to accommodate multiple sheets stacked one on another, a sheet feeding unit disposed facing a top sheet of the multiple sheets set in the loading section to transport the top sheet from the loading section, a separation section disposed downstream in a sheet conveyance direction from the sheet feeding unit to separate at a separation position (Ab) one by one the multiple sheets transported by the sheet feeding unit, a conveyance member to transport the sheet separated by the separation section, a trailing-edge detector disposed at a first conveyance distance (L1) downstream from the separation position (Ab) in the sheet conveyance direction to detect a trailing edge of the sheet, a first leading-edge detector disposed downstream from the trailing-edge detector to detect a leading edge of the sheet, and a controller to cause the sheet feeding unit to start sheet feeding at a predetermined timing.

The trailing-edge detector includes a rotary follower to rotate as the sheet moves and a rotation detector to detect rotation of the rotary follower, and a length of the sheet in the sheet conveyance direction is detected using the trailing-edge detector. When the detected length of the sheet in the sheet conveyance direction equals a predetermined reference length, the controller causes the sheet feeding unit to start sheet feeding in response to detection of the leading edge of the sheet by the first leading-edge detector. In other cases, the controller causes the sheet feeding unit to start sheet feeding in response to detection of the trailing edge of the sheet by the trailing-edge detector.

In another embodiment, the length of the sheet is detected by a detector other than the trailing-edge detector.

Yet another embodiment provides an image reading device that includes the above-described sheet conveyance device.

Yet another embodiment provides an image forming apparatus that includes the above-described sheet conveyance device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 13B is a flowchart for controlling feeding start of a third and subsequent sheets;

DETAILED DESCRIPTION OF THE INVENTION

Figure 1:
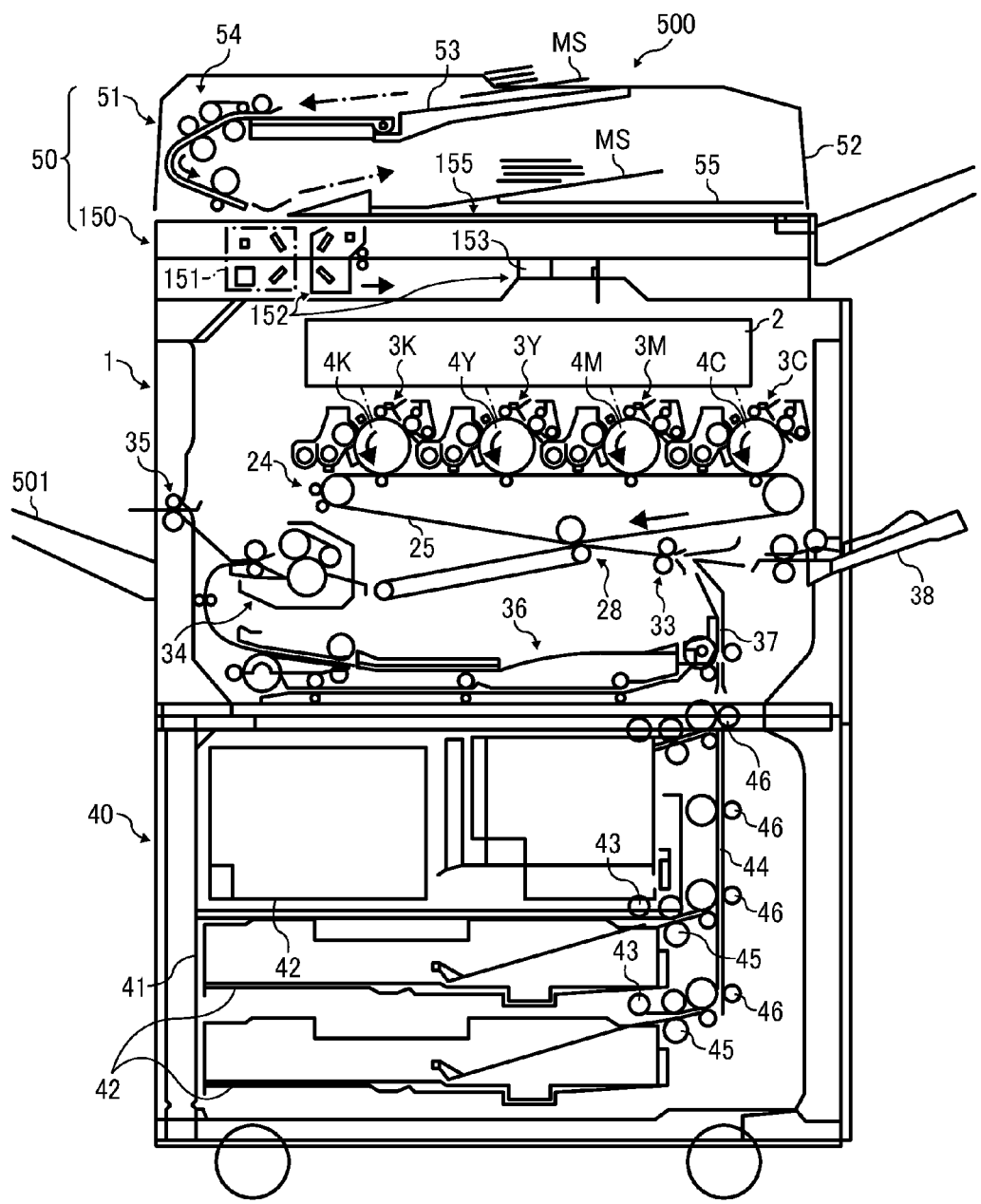
FIG. 1 is a schematic diagram illustrating a configuration of an image forming apparatus according to an embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an electrophotographic image forming apparatus according to an embodiment of the present invention is described.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

FIG. 1 is a schematic diagram illustrating an image forming apparatus 500 that is a copier, for example.

The image forming apparatus 500 includes an image forming unit 1, a sheet feeder 40, and an image reading unit 50. The image reading unit 50 includes a scanner 150 fixed on the image forming unit 1 and an automatic document feeder (ADF) 51 disposed above and supported by the scanner 150. The ADF 51 serves as a sheet conveyance device.

The sheet feeder 40 includes a paper bank 41 including two sheet cassettes 42, feed rollers 43, and separation rollers 45. The feed rollers 43 pick up transfer sheets (recording media) contained in the respective sheet cassettes 42 and send out the transfer sheet from the sheet cassettes 42. Then, the corresponding separation roller 45 separates the transfer sheet from the rest contained in the sheet cassette 42 and feeds it to a sheet feeding path 44. The sheet feeder 40 further includes multiple conveyance rollers 46 to transport the transfer sheet to a conveyance path 37 formed in the image forming unit 1. Thus, the transfer sheet contained in the sheet cassette 42 is transported to the conveyance path 37 in the image forming unit 1 (i.e., an apparatus body).

Figure 6:
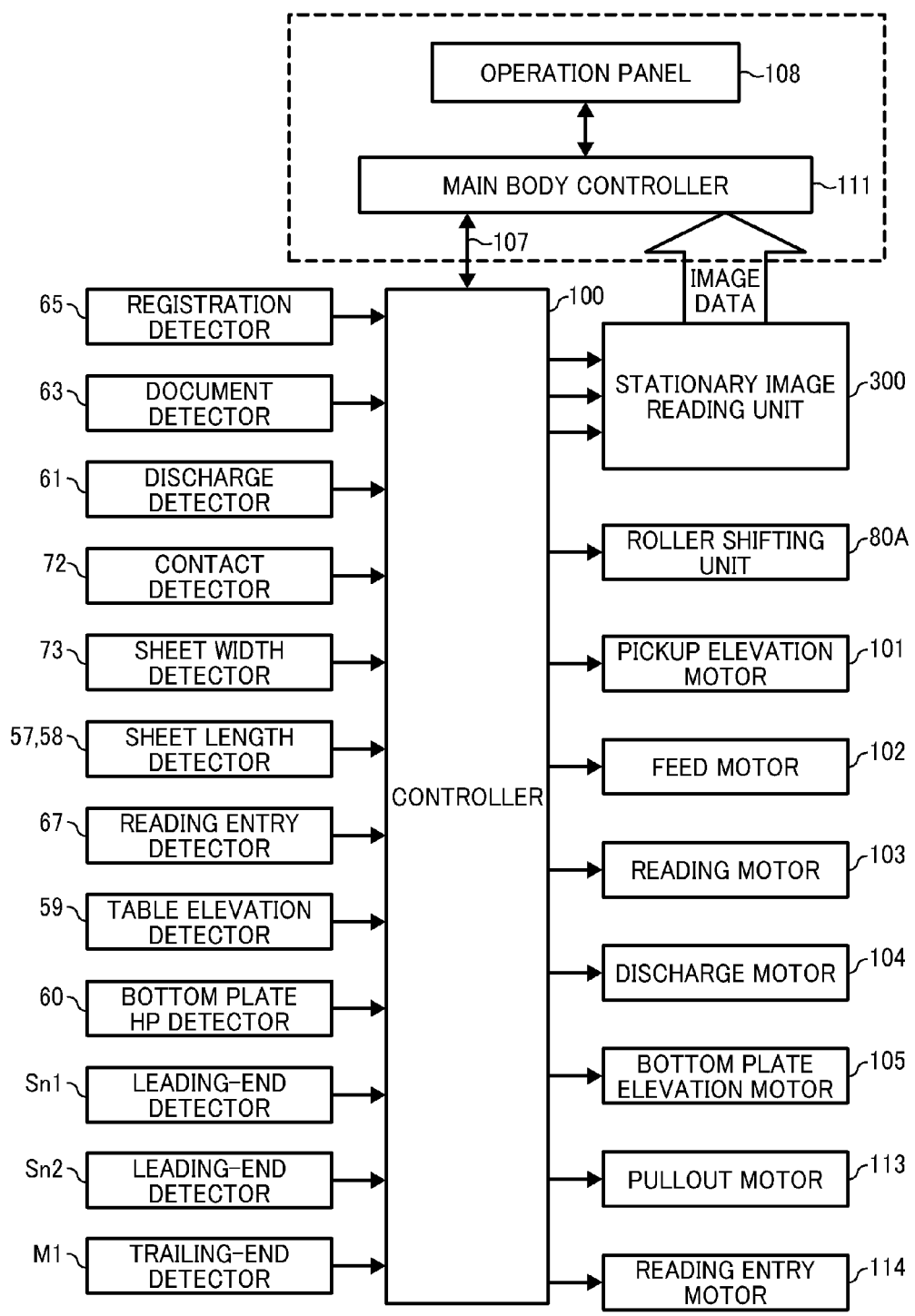
FIG. 6 is a block diagram illustrating circuitry of an electric circuit of the ADF.

The image forming unit 1 includes an optical writing device 2, four process units 3K, 3Y, 3M, and 3C for forming black (K), yellow (Y), magenta (M), and cyan (C) toner images, respectively, a transfer unit 24, a sheet conveyance unit 28, a pair of registration rollers 33, a fixing device 34, a switchback unit 36, and a controller 111 (also "apparatus body controller 111") shown in FIG. 6 in addition to the conveyance path 37. The controller 111 drives a light source, such as a laser diode or light-emitting diode (LED), provided in the optical writing device 2 to direct laser beams (writing light) L to drum-shaped photoreceptors 4K, 4Y, 4M, and 4C. With the laser beams L, electrostatic latent images are formed on the respective photoreceptors 4K, 4Y, 4M, and 4C, which are developed into toner images in a development process.

Figure 2:
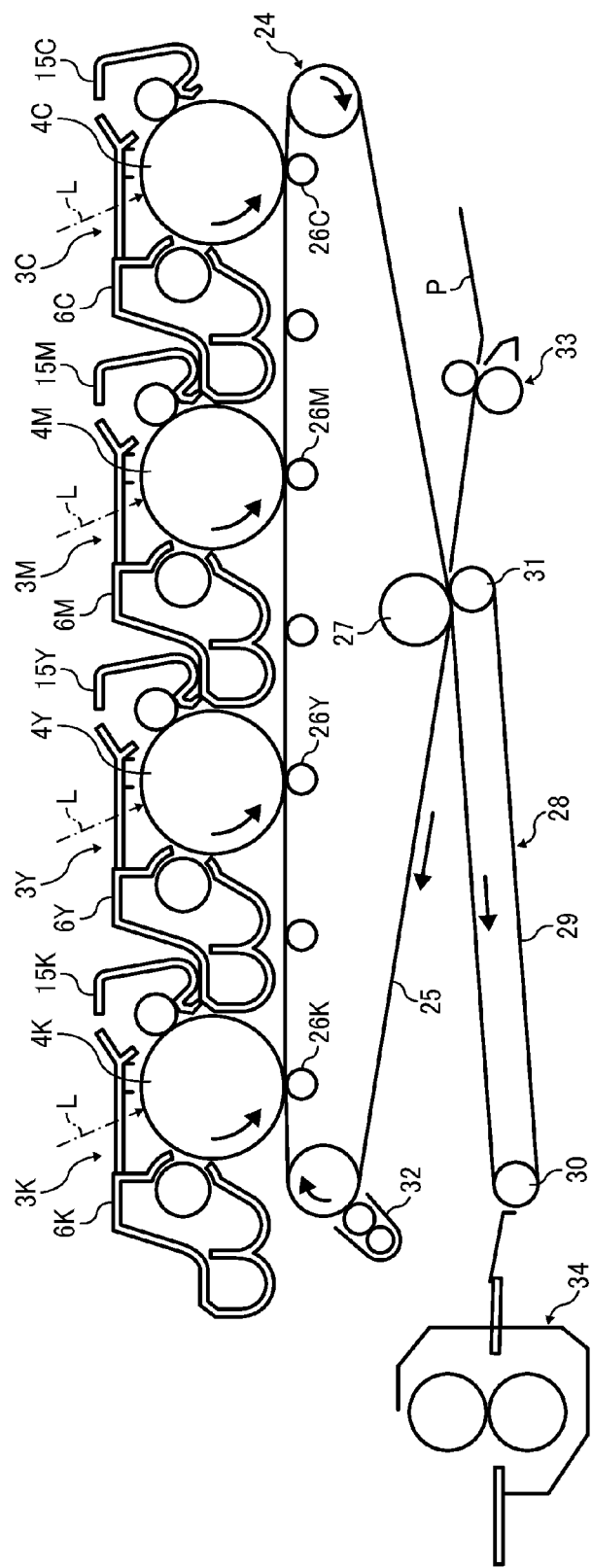
FIG. 2 is a schematic diagram illustrating an interior of an image forming unit in the image forming apparatus shown in FIG. 1.
Figure 3:
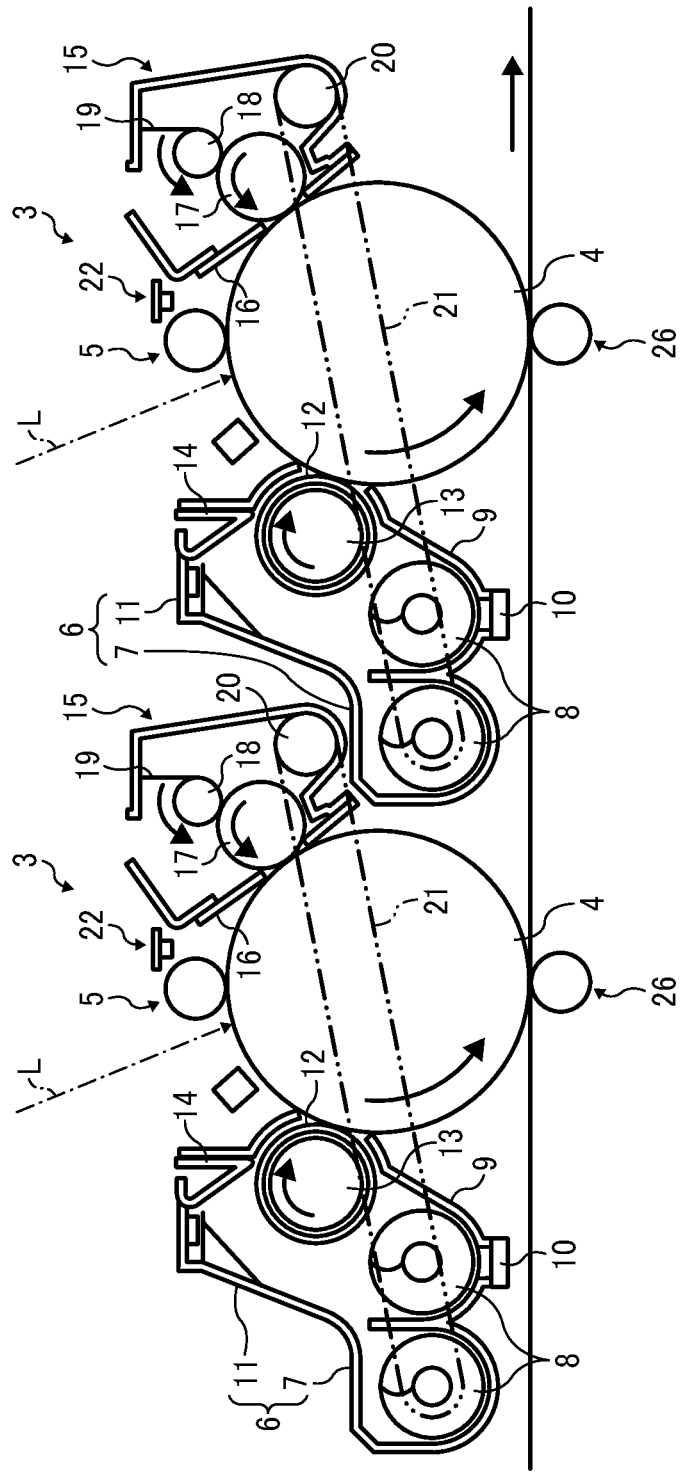
FIG. 3 is an enlarged view of a tandem unit including four process units in the image forming unit shown in FIG. 2.

FIG. 2 is a partial view that illustrates an interior of the image forming unit 1. FIG. 3 is an enlarged view of a tandem image forming unit including the four process units 3K, 3Y, 3M, and 3C. It is to be noted that the four process units 3K, 3Y, 3M, and 3C have a similar configuration except the color of toner used therein, and the subscripts Y, K, M, and C attached to the end of reference numerals are omitted in FIG. 3.

In each process unit 3, the photoreceptor 4 and the components provided around the photoreceptor 4 are housed in a common casing, and each process unit 3 is removably installable in the image forming unit 1. The process unit 3 includes a charging member 5 (shown in FIG. 3), a development device 6, a drum cleaning unit 15, and a discharge lamp 22 (shown in FIG. 3), provided around the photoreceptor 4. The image forming apparatus 500 is tandem type and the four process units 3K, 3Y, 3M, and 3C are disposed facing an intermediate transfer belt 25 and arranged in parallel to each other in the direction in which the intermediate transfer belt 25 travels.

For example, the drum-shaped photoreceptor 4 includes an aluminum base pipe and an organic photosensitive layer overlying it. The photosensitive layer can be formed by application of an organic photosensitive material to the aluminum base pipe. The shape of the photoreceptor 4 is not limited thereto and may be shaped like an endless belt.

The development device 6 develops latent images formed on the photoreceptor 4 with two-component developer including magnetic carrier and nonmagnetic toner. The interior of the development device 6 is divided into an agitation compartment 7 for agitating the developer and a development compartment 11. The developer contained in the agitation compartment 7 is fed to a rotary development sleeve 12, from which the developer is transferred to the photoreceptor 4 in the development compartment 11.

The agitation compartment 7 is positioned lower than the development compartment 11 and includes two conveyance screws 8 arranged in parallel to each other, a partition disposed between them, and a toner concentration detector 10 provided on the bottom surface of a development casing 9.

The development compartment 11 includes the development sleeve 12 facing the photoreceptor 4 through an opening of the development casing 9, a stationary magnet roller 13 provided inside the development sleeve 12, and a doctor blade 14. An end of the doctor blade 14 is positioned adjacent to the development sleeve 12. The development sleeve 12 is a rotatable nonmagnetic cylindrical member. The magnet roller 13 includes multiple magnetic poles arranged in the direction of rotation of the development sleeve 12 from a position facing the doctor blade 14. These magnetic poles exert magnetic force on the two-component developer at predetermined positions in the direction of rotation of the development sleeve 12. With the magnetic force, the two-component developer transported from the agitation compartment 7 is attracted to the surface of the development sleeve 12, carried thereon, and is caused to form a magnetic brush on the development sleeve 12 along the magnetic force lines.

As the development sleeve 12 rotates, the magnetic brush passes through a position facing the doctor blade 14, where the amount of the magnetic bush is adjusted. Then, the magnetic brush is further transported to a development range facing the photoreceptor 4. The developer is transferred to the electrostatic latent image formed on the photoreceptor 4 with the difference in electrical potential between a development bias applied to the development sleeve 12 and the electrostatic latent image. As the development sleeve 12 further rotates, the developer that has passed through the development range is returned to the development compartment 11, separated from the development sleeve 12 due to effects of a repulsive magnetic field generated between the magnetic poles of the magnet roller 13, and then is returned to the agitation compartment 7. Toner is supplied to the agitation compartment 7 as required based on detection results generated by the toner concentration detector 10. Alternatively, one-component development devices that use one-component developer that does not include magnetic carrier can be adopted.

Although the drum cleaning unit 15 includes an elastic cleaning blade 16 pressed against the photoreceptor 4 in the configuration shown in FIG. 3, different configurations may be used. To improve the cleaning performance, in the configuration shown in FIG. 3, an electroconductive fur brush 17 disposed rotatively in the direction indicated by arrow shown in FIG. 3 is used. An outer circumferential surface of the fur brush 17 contacts the photoreceptor 4. The fur brush 17 also serves as a lubricant applicator. The fur brush 17 scrapes off lubricant from a solid lubricant, making it into fine powder, and applies it to the surface of the photoreceptor 4. In addition, a metal electrical field roller 18 to apply a bias to the fur brush 17 is provided rotatively in the direction indicated by arrow shown in FIG. 3, and an end of a scraper 19 is pressed against the electrical field roller 18. The bias is applied to the electrical field roller 18 while the electrical field roller 18 rotates in the direction counter to the direction of rotation of the fur brush 17 and contacts the fur brush 17. Thus, the toner adhering to the fur brush 17 is transferred to the electrical field roller 18. The toner is removed from the electrical field roller 18 by the scraper 19 and drops to a collecting screw 20. The collecting screw 20 transports the toner removed from the electrical field roller 18 to an end in the direction perpendicular to the surface of the paper on which FIG. 3 is drawn and sends it to a recycle toner conveyance unit 21 provided outside the drum cleaning unit 15. The recycle toner conveyance unit 21 transports the toner to the development device 6 for reuse.

The discharge lamp 22 discharges the surface of the photoreceptor 4 with irradiation of light. Then, the surface of the photoreceptor 4 is charged uniformly by the charging member 5, after which the optical writing device 2 performs optical writing. It is to be noted that, although the roller-shaped charging member 5 disposed in contact with the photoreceptor 4, to which a charge bias is applied, is used in the present embodiment, contactless scorotron chargers or the like may be used.

Through the process described above, black, yellow, magenta, and cyan toner images are formed on the photoreceptors 4K, 4Y, 4M, and 4C in the respective process units 3K, 3Y, 3M, and 3C.

The transfer unit 24 is provided beneath the four process units 3K, 3Y, 3M, and 3C. In the transfer unit 24, the intermediate transfer belt 25 is stretched around multiple rollers. The intermediate transfer belt 25 moves clockwise in the drawing and slidingly contacts the photoreceptors 4K, 4Y, 4M, and 4C. The portions where the photoreceptors 4K, 4Y, 4M, and 4C are in contact with the intermediate transfer belt 25 are called primary-transfer nips. Primary-transfer rollers 26K, 26Y, 26M, and 26C are provided inside the loop of the intermediate transfer belt 25 and adjacent to the respective primary-transfer nips. The primary-transfer rollers 26K, 26Y, 26M, and 26C press the intermediate transfer belt 25 against the photoreceptors 4K, 4Y, 4M, and 4C, respectively. A primary-transfer bias is applied to each primary-transfer roller 26. Thus, primary-transfer electrical fields are formed in the primary-transfer nips to transfer the toner images formed on the respective photoreceptors 4K, 4Y, 4M, and 4C electrostatically onto the intermediate transfer belt 25. As the intermediate transfer belt 25 rotates clockwise in FIG. 2 and passes through the four primary-transfer nips sequentially, the toner images are superimposed one on another on a front surface of the intermediate transfer belt 25 in the primary-transfer process. Thus, a superimposed four-color toner image is formed on the intermediate transfer belt 25.

The sheet conveyance unit 28 is positioned beneath the transfer unit 24 in FIG. 1 and includes an endless conveyance belt 29 that rotates endlessly, stretched between a driving roller 30 and a secondary-transfer roller 31. The intermediate transfer belt 25 and the conveyance belt 29 are nipped between the secondary-transfer roller 31 and a tension roller 27. Thus, the front surface of the intermediate transfer belt 25 is in contact with a front surface of the conveyance belt 29, forming a secondary-transfer nip. A secondary-transfer bias is applied to the secondary-transfer roller 31 from a power source. By contrast, the tension roller 27 of the transfer unit 24 is grounded. Thus, a secondary-transfer electrical field is generated in the secondary-transfer nip.

The registration rollers 33 are positioned on the right of the secondary-transfer nip in FIG. 2. Additionally, a registration roller detector is provided adjacent to an entrance of the nip between the registration rollers 33 (registration nip). After a predetermined time has elapsed from when the registration roller detector detects the leading edge of the transfer sheet P transported from the sheet feeder 40 to the registration rollers 33, conveyance of the transfer sheet P is suspended, and the leading edge of the transfer sheet P is caught in the nip between the registration rollers 33. Thus, the position of the transfer sheet P is adjusted, and the transfer sheet P is prepared for synchronization with image formation.

When the leading-end portion of the transfer sheet P is caught in the registration nip, the registration rollers 33 resume rotation to forward the transfer sheet P to the secondary-transfer nip, timed to coincide with the four-color toner image formed on the intermediate transfer belt 25. In the secondary-transfer nip, the four-color toner image is transferred secondarily from the intermediate transfer belt 25 onto the transfer sheet P at a time and becomes a full-color toner image (hereinafter "multicolor toner image") on the white transfer sheet P. After passing through the secondary-transfer nip, the transfer sheet P is separated from the intermediate transfer belt 25 and is carried on the front side of the conveyance belt 29. As the conveyance belt 29 rotates, the transfer sheet P is transported to the fixing device 34.

Herein, some toner tends to remain on the front surface of the intermediate transfer belt 25 that has passed through the secondary-transfer nip. The toner remaining on the intermediate transfer belt 25 is removed by a belt cleaning unit 32 disposed in contact with the intermediate transfer belt 25.

In the fixing device 34, the full-color toner image is fixed on the transfer sheet P with heat and pressure, after which the transfer sheet P is discharged by a pair of discharge rollers 35 outside the apparatus onto a discharge tray 501.

The switchback unit 36, positioned beneath the sheet conveyance unit 28 and the fixing device 34 in FIG. 1, is a mechanism for reversing transfer sheets. In duplex printing, after an image is formed on one side of the transfer sheet P, the conveyance route of the transfer sheet P is switched with a switching pawl toward the switchback unit 36. Then, the transfer sheet P is reversed and transported again to the secondary-transfer nip. After an image is formed on the other side of the transfer sheet P, the transfer sheet P is discharged to the discharge tray 501.

The image forming apparatus 500 further includes a side tray 38 provided to a side wall of the apparatus, and the side tray 38 can be lifted to close relative to the side wall. Either sheets fed by the sheet feeder 40 or those transported from the side tray 38 are transported to the registration rollers 33.

The image reading unit 50, which includes the scanner 150 fixed on the image forming unit 1 and the ADF 51 provided above it, further includes a first stationary reading unit 151, and a movable reading unit 152. An ADF cover 52 of the ADF 51 provided above the scanner 150 holds a document table 53 on which original documents MS to be scanned are set, a document conveyance unit 54, and a document stack table 55 on which the original documents MS are stacked after image scanning.

A second exposure glass 155 is fixed to an upper wall of the casing of the scanner 150 to contact the original document MS, and the movable reading unit 152 is positioned immediately below the second exposure glass 155. The movable reading unit 152 can move an optical system including a light source and multiple reflecting mirrors laterally in FIG. 1. While moving the optical system from the left to the right in FIG. 1, the light emitted from the light source is reflected on the lower side of the original document MS placed on the second exposure glass 155 and directed via the multiple reflecting mirrors to an image reading sensor 153 fixed to the scanner 150.

In addition to the first stationary reading unit 151 provided in the scanner 150, a second stationary reading unit 95 (shown in FIG. 5) is provided in the ADF 51. The first stationary reading unit 151 includes a light source, reflecting mirrors, and a charge-coupled device (CCD) and is positioned immediately below a first exposure glass 154 fixed to the upper wall of the casing of the scanner 150. When the original document MS transported by the ADF 51 passes above the first exposure glass 154, the light emitted from the light source is reflected on a first side of the original document MS and directed via the multiple reflecting mirrors to the image reading sensor 153. Thus, without moving the optical system including the light source and the reflecting mirrors, the first side of the original document MS can be scanned. The second stationary reading unit 95 scans a second side of the original document MS that has passed through the first stationary reading unit 151.

Figure 4:
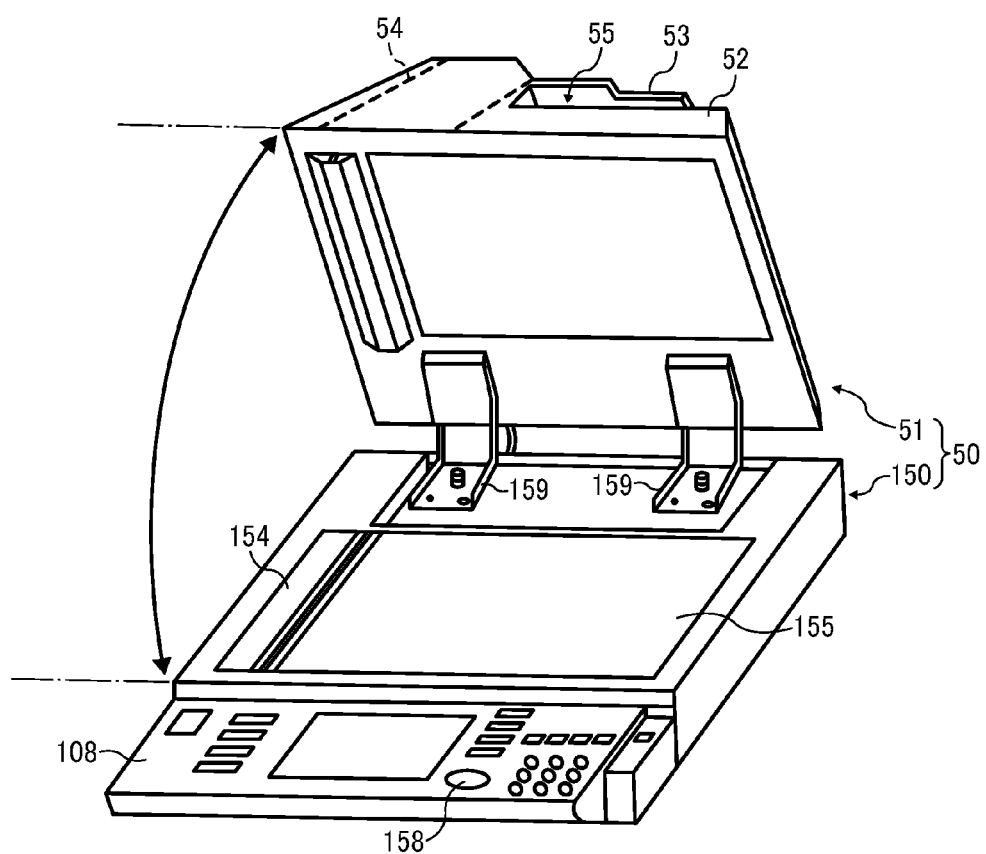
FIG. 4 is a perspective view illustrating a scanner and an automatic document feeder (ADF) included in the image forming apparatus.

As shown in FIG. 4, the ADF 51 is hinged by hinges 159 fixed to the scanner 150 and is pivotable vertically. Thus, the ADF 51 can be lifted to open relative to the scanner 150. When the ADF 51 is lifted, the first exposure glass 154 and the second exposure glass 155 on the upper side of the scanner 150 are exposed. When a bundle of original documents are bound together, in particular, stitched or stapled on one side (hereinafter "side-stitched documents") like books, the sheets cannot be separated one by one and cannot be transported by the ADF 51. Therefore, in the case of side-stitched documents, the automatic document feeder 51 is lifted as shown in FIG. 4, and the side-stitched documents is opened to the page to be scanned and placed on the second exposure glass 155 with the page faced down, after which the ADF 51 is moved down to close. Then, the movable reading unit 152 shown in FIG. 1 of the scanner 150 reads image data of that page.

By contrast, when not bound together, a bundle of original documents MS can be transported by the ADF 51 one by one and then sequentially read by the first stationary reading unit 151 in the scanner 150 and the second stationary reading unit 95 in the ADF 51. In this case, users place the bundle on the document table 53 and push a start button 158 in an operation panel 108 (shown in FIG. 4). Then, the ADF 51 forwards the bundle of original documents MS set on the document table 53 sequentially from the top to the document conveyance unit 54 and reverses the original documents MS to the document stack table 55. In this process, the original document MS passes above the first stationary reading unit 151 of the scanner 150 immediately after being reversed. At that time, the first stationary reading unit 151 reads image data of the first side of the original document MS.

Next, the ADF 51 is described in further detail below.

Figure 5:
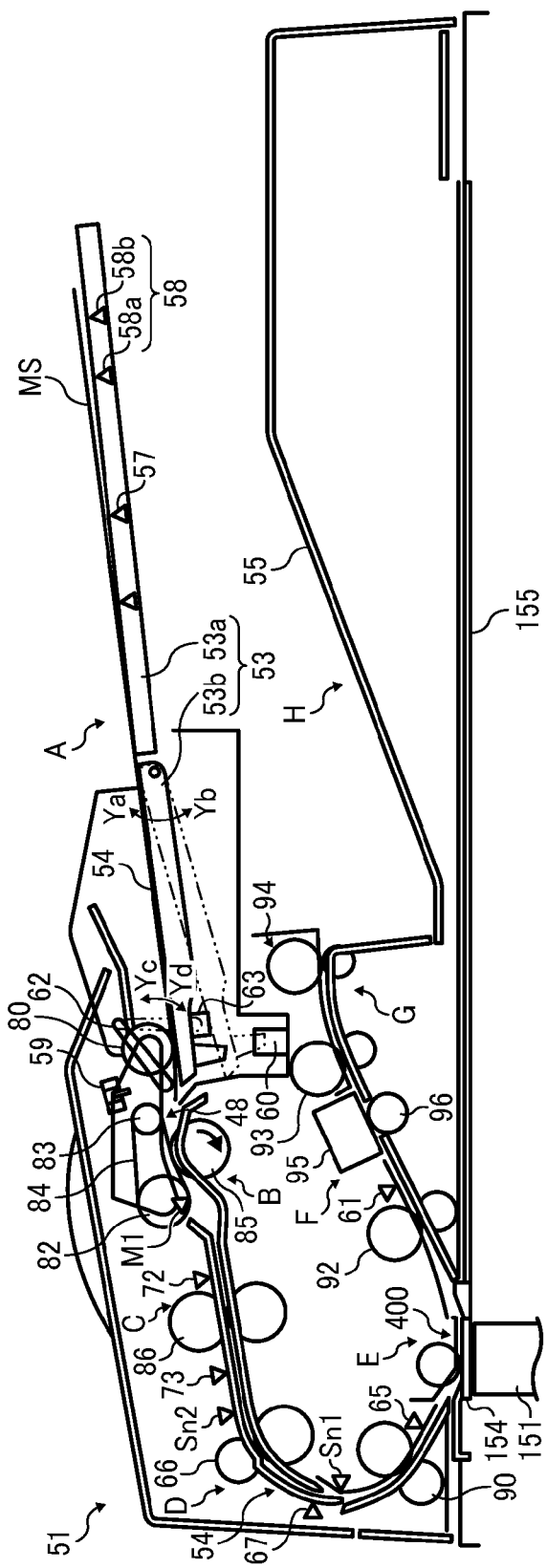
FIG. 5 is a schematic view of a main portion of the ADF and an upper portion of the scanner.

FIG. 5 is an enlarged view that illustrates a main part of the ADF 51 serving as the sheet conveyance device and the upper portion of the scanner 150. The ADF 51 includes a document loading section A, a separation section B, a registration section C, a turning section D, a first reading section E, a second reading section F, a discharge section and a stack section H, arranged in that order in the sheet conveyance direction in the ADF 51. The ADF 51 according to the present embodiment further includes a trailing-edge detector M1 provided downstream from the separation section B and a pair of reading entrance rollers 90. The document conveyance unit 54 constitutes a conveyance path of the original document MS extending from a detection position by the trailing-edge detector M1 to the pair of reading entrance rollers 90.

The document loading section A includes the document table 53 on which the bundle of original documents MS is placed with the first side faced up. The separation section B includes a conveyance belt 84 stretched around a driving roller 82 and a driven roller 83, and a reverse roller 85. The separation section B separates and transports the bundle of original documents MS one by one.

The registration section C stops the original document MS temporarily for alignment and forwards the original document MS downstream in the sheet conveyance direction. The turning section D includes a C-shaped curved portion in which the original document MS is folded back to be reversed upside down so that the first side of the original document MS is faced down. In the first reading section E, the first stationary reading unit 151 provided in the scanner 150 reads from below the first side of the original document MS while the original document MS is transported above the first exposure glass 154. In the second reading section F, while a support roller 96 provided beneath the second stationary reading unit 95 transports the original document MS, the second stationary reading unit 95 reads the second side of the original document MS. The discharge section G discharges the original document MS to the stack section H after image scanning. The stack section H is for stacking the original documents MS on the document stack table 55.

As shown in FIG. 5, the ADF 51 further includes a table elevation detector or upper surface detector 59, a bottom plate home position (HP) detector 60, a discharge detector 61, a document detector 63, a registration detector 65, a reading entry detector 67, a contact detector 72, a sheet width detector 73, and sheet length detectors 57 and 58.

FIG. 6 is a block diagram illustrating electrical circuitry of the ADF 51.

The electrical circuitry of the ADF 51 shown in FIG. 6 includes a controller 100 that includes a central processing unit (CPU) and data storage units such as a random access memory (RAM) and a read only memory (ROM). The controller 100 can execute various types of computation and control programs. The control block of the ADF 51 includes a driving unit for document feeding, various detectors or sensors, a stationary image reading unit 300 (the first stationary reading unit 151 or the second stationary reading unit 95), and the controller 100 that controls a sequence of operations of the ADF 51. The driving unit for document feeding includes a pickup elevation motor 101, a feed motor 102, a reading motor 103, a discharge motor 104, a bottom plate elevation motor 105, a pullout motor 113, and a reading entry motor 114. The detectors include sheet length detectors 57 and 58, the table elevation detector 59, the bottom plate home position (HP) detector 60, the discharge detector 61, the document detector 63, the registration detector 65, the contact detector 72, the sheet width detector 73, the reading entry detector 67, first and second leading-edge detectors Sn1 and Sn2, and the trailing-edge detector M1.

Figure 7:
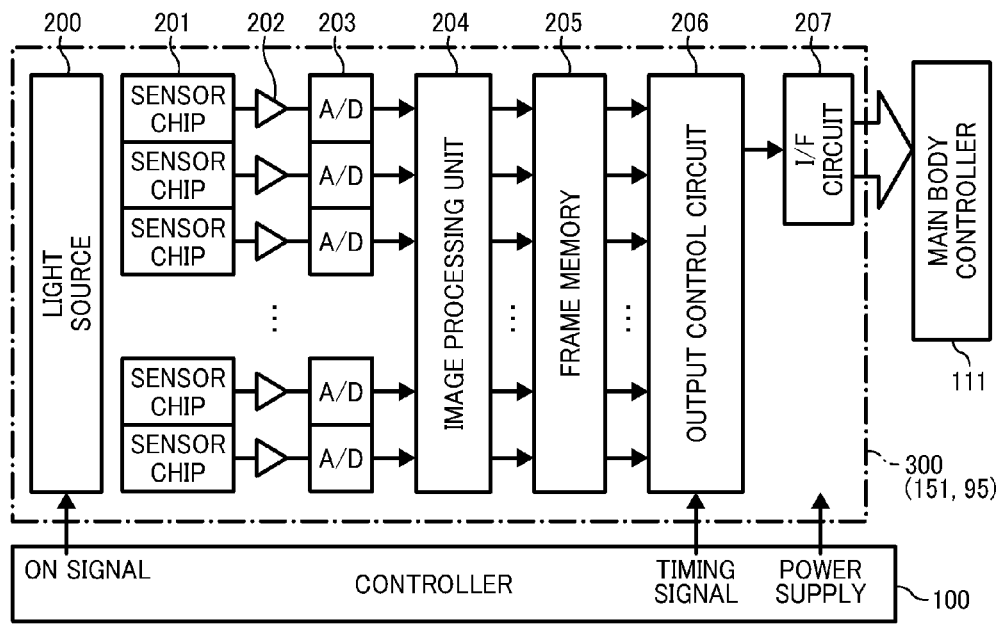
FIG. 7 is a block diagram that illustrates electrical circuitry of a stationary image reading unit partially.

FIG. 7 is a block diagram that illustrates electrical circuitry of the stationary image reading unit 300 partially.

As shown in FIG. 7, the stationary image reading unit 300 includes a light source 200, multiple sensor chips 201 arranged in a main scanning direction (width direction of original documents), multiple individual OP amplifier circuits 202 connected to the respective sensor chips 201, multiple A/D converters 203 connected to the respective OP amplifier circuits 202, an image processing unit 204, a frame memory 205, an output control circuit 206, and an interface (I/F) circuit 207. The light source 200 can be a light-emitting diode (LED), a fluorescent, or a cold cathode tube, for example.

Referring to FIG. 5, the document table 53, on which the original document MS to be scanned is placed with the first side faced up, includes a movable document table 53b that supports the leading-end portion of the original document MS and a stationary document table 53a that supports the trailing-end portion of the original document MS. The movable document table 53b is movable in the directions indicated by arrows Ya and Yb shown in FIG. 5. On the document table 53, side guides are brought into contact with both sides of the original document MS in the width direction of the original document MS, perpendicular to the sheet conveyance direction. Thus, the position of the original document MS in the width direction is determined.

A set feeler 62 serving as a lever is provided pivotably above the movable document table 53b, and the original document MS set on the document table 53 pushes up the set feeler 62. Accordingly, the document detector 63 detects presence of original document MS set on the document table 53 and transmits a detection signal to the controller 100. Further, the controller 100 transmits the detection signal to the apparatus body controller 111 via the I/F circuit 107 (hereinafter simply "I/F 107").

The stationary document table 53a is provided with sheet length detectors 57 and 58 (58a and 58b) to detect the length of the original document MS in the sheet conveyance direction. Each of them can be a reflective photosensor or an actuator-type sensor capable of detecting the length of the original document MS even when only a single sheet is set on the document table 53. Based on the detection results generated by at least one of the sheet length detectors 57 and 58, the length of the original document MS in the sheet conveyance direction is roughly judged or estimated.

The pickup roller 80 is provided above the movable document table 53b. The bottom plate elevation motor 105 causes the movable document table 53b to pivot in the direction indicated by arrows Ya and Yb shown in FIG. 5 via a cam mechanism serving as a table shifting unit. When it is detected that a bundle of original documents MS is set on the document table 53 using the set feeler 62 and the document detector 63, the controller 100 rotates the bottom plate elevation motor 105 in a forward direction to lift the document table 53 so that the top side of the bundle contacts the pickup roller 80.

The pickup roller 80 is movable in the direction indicated by arrows Yc and Yd in FIG. 5 with a cam mechanism driven by a pickup elevation motor 101. Additionally, as the movable document table 53b ascends, the pickup roller 80 ascends in the direction indicated by arrow Yc in FIG. 5, pressed by the upper side of the original documents MS set on the movable document table 53b. The table elevation detector or upper surface detector 59 to detect the level of the upper surface of the original document MS detects elevation of the pickup roller 80, and thus it is detected that the movable document table 53b has ascended to an upper limit, that is, the upper surface of the original document MS has ascended to an upper limit. Then, the pickup elevation motor 101 as well as the bottom plate elevation motor 105 stops. It is to be noted that, in the configuration described above, the upper surface detector 59 indirectly detects whether the upper surface of the original document MS has ascended to the upper limit by detecting a portion of a holder that holds the pickup roller 80 movably. Alternatively, a configuration to directly detect the upper surface level of the original document MS may be employed.

When the user presses the start button 158 provided on the operation panel 108, a document feeding signal is transmitted from the controller 111 in the apparatus body via the I/F 107 to the controller 100 of the ADF 51. Then, the feed motor 102 is driven to rotate the pickup roller 80, and the pickup roller 80 picks up one or several sheets (preferably, a single sheet) from the bundle of original documents MS from the document loading section A. The pickup roller 80 rotates in the direction to transport the top sheet of the bundle of original documents MS to a feeding opening 48.

The original document MS sent out by the pickup roller 80 enters the separation section B and is transported to a position to contact the conveyance belt 84 that endlessly rotates clockwise in FIG. 5 as the driving roller 82 rotates, driven by forward rotation of the feed motor 102.

The reverse roller 85 serving as a separator is provided in contact with a lower portion of the conveyance belt 84 stretched laterally in FIG. 5. The reverse roller 85 rotates clockwise in FIG. 5, driven by the forward rotation of the feed motor 102. In this contact portion, the conveyance belt 84 moves in the sheet conveyance direction. Although the reverse roller 85 tries to rotate in the direction opposite the sheet conveyance direction, a drive transmission unit for the reverse roller 85 includes a torque limiter, and the reverse roller 85 rotates in the sheet conveyance direction when the force in the sheet conveyance direction is greater than the torque of the torque limiter. The reverse roller 85 is pressed against the conveyance belt 84 at a predetermined pressure, thus forming a separation nip Ab (i.e., a separation portion) shown in FIG. 8. When the reverse roller 85 is in direct contact with the conveyance belt 84, or only a single original document MS is present in the separation nip Ab, the reverse roller 85 rotates in the direction in which the conveyance belt 84 or the original document MS moves. However, when multiple original documents MS are present in the separation nip Ab, the reverse roller 85 rotates clockwise in FIG. 5, opposite the direction in which the conveyance belt 84 moves, because the force to follow rotation of the conveyance belt 84 is lower than the torque of the torque limiter. With this configuration, the reverse roller 85 applies a force in the direction opposite the sheet conveyance direction to the sheets under the top sheet, thus separating the top sheet from the rest. Thus, feeding error called "multifeed", in which multiple sheets are fed at a time, can be prevented.

The original document MS separated from the rest by the conveyance belt 84 and the reverse roller 85 then enters the registration section C. The original document MS is further transported by the conveyance belt 84, and the contact detector 72 detects a leading edge of the original document MS. The original document MS is further transported to contact a pair of pullout rollers 86 being motionless. Subsequently, the feed motor 102 is driven for a predetermined period from when the contact detector 72 detects the leading edge of the original document MS and stops. With this operation, the original document MS is transported a predetermined amount from the position where the original document MS is detected by the contact detector 72. Consequently, conveyance of the original document MS by the conveyance belt 84 is stopped with the original document MS pressed against the pair of pullout rollers 86 and deformed a predetermined amount. When the contact detector 72 detects the leading edge of the original document MS, the pickup elevation motor 101 is rotated, thus moving away the pickup roller 80 from the upper side of the original document MS. Then, the original document MS is transported with only the conveyance force exerted by the conveyance belt 84. Thus, the leading edge of the original document MS enters a nip formed between the pullout rollers 86, and alignment of the leading-end portion (skew correction) is performed.

The pair of pullout rollers 86 has a capability of skew correction as described above and further serves as conveyance rollers to transport the aligned original document MS to a pair of intermediate rollers 66 after the original document MS is separated from the rest and aligned. The pullout motor 113 drives one of the pullout rollers 86.

The original document MS forwarded by the pair of pullout rollers 86 then passes immediately below the sheet width detector 73. The sheet width detector 73 includes multiple sheet detectors, such as reflective photosensors or the like, arranged in the width direction of the original document MS, perpendicular to the surface of the paper on which FIG. 5 is drawn. The size of the original document MS in the width direction can be recognized based on which of the multiple sheet detectors detects the original document MS. The length of the original document MS in the sheet, conveyance direction is recognized based on the motor pulses during the period from when the contact detector 72 detects the leading edge of the original document MS to when the contact detector 72 stops detecting the presence of the original document MS, that is, the contact detector 72 detects passage of the trailing edge of the original document MS.

The original document MS is transported by the pair of pullout rollers 86 and the pair of intermediate rollers 66 to the turning section D, in which the pair of intermediate rollers 66 and the pair of reading entrance rollers 90 transport the original document MS.

The pair of intermediate rollers 66 receives driving force from the pullout motor 113 to drive the pair of pullout rollers 86 as well as the reading entry motor 114 to drive the pair of reading entrance rollers 90. The intermediate rollers 66 are provided with a mechanism to set the rotational velocity in accordance with driving of one of the two motors that rotates faster.

In the image reading unit 50, the conveyance velocity at which the original document MS is transported by the pair of pullout rollers 86 and the pair of intermediate rollers 66 in the registration section C is faster than the conveyance velocity in the first reading section E to reduce the time required to forward the original document MS to the first reading section E. At that time, the pair of intermediate rollers 66 is driven by the pullout motor 113.

When the reading entry detector 67 detects the leading edge of the original document MS, deceleration of the pullout motor 113 is started to reduce the conveyance velocity to the conveyance velocity in the first reading section E before the leading edge of the original document MS enters the nip formed between the reading entrance rollers 90. Simultaneously, the reading entry motor 114 as well as the reading motor 103 starts forward rotation. The forward rotation of the reading entry motor 114 causes the pair of reading entrance rollers 90 to rotate in the sheet conveyance direction. Additionally, the forward rotation of the reading motor 103 causes a pair of first reading exit rollers 92 as well as a pair of second reading exit rollers 93 to rotate in the sheet conveyance direction.

When the registration detector 65 detects the leading edge of the original document MS moving from the turning section D to the first reading section E, the controller 100 takes a predetermined or given time period to decelerate the respective motors so that the conveyance velocity of the original document MS can be decelerated while the original document MS travels a predetermined or given distance. Then, the controller 100 stops the original document MS upstream from a first reading position 400 at which the first stationary reading unit 151 scans the original document MS and transmits a registration stop signal to the apparatus body controller 111 via the I/F 107. Subsequently, receiving a reading start signal from the apparatus body controller 111, the controller 100 controls driving of the reading entry motor 114 as well as the reading motor 103 to raise the conveyance velocity of the original document MS to a predetermined velocity before the leading edge of the originals MS, which is stopped for registration at that time, arrives at the first reading position 400. With this operation, the original document MS is transported to the first reading position 400 while the conveyance velocity thereof is increased. The controller 100 of the ADF 50 transmits to the controller 111a gate signal indicating an effective image area of the original document MS in a sub-scanning direction at a timing at which the leading edge of the original document MS is expected to arrive at the first reading position 400, calculated based on the pulse count of the reading entry motor 114. The transmission of the gate signal is continued until the trailing edge of the original document MS exits from the first reading position 400, and the first stationary reading unit 151 reads image data on the first side of the original document MS.

After passing through the first reading section E, the original document MS passes through the nip between the first reading exit rollers 92, after which the discharge detector 61 detects the leading edge of the original document MS. The original document MS is further transported through the second reading section F to the discharge section G.

In single-side scanning to read image data of one side (first side) of the original document MS, image reading by the second stationary reading unit 95 is not necessary. Therefore, when the discharge detector 61 detects the leading edge of the original document MS, the discharge motor 104 starts forward rotation, thereby rotating the upper discharge roller 94 counterclockwise in FIG. 5. In addition, the timing at which the trailing end of the originals MS exits from the nip between the discharge rollers 94 is estimated based on the pulse count of the discharge motor 104 counted after the discharge detector 61 detects the leading edge of the original document MS. Then, based on the estimated timing, the discharge motor 104 is decelerated immediately before the trailing end of the originals MS exits from the nip between the discharge rollers 94 to transport the original document MS to the document stack table 55 at a decreased velocity such that the original document MS does not fall from the document stack table 55.

By contrast, in double-side scanning to read image data of both sides (first and second sides) of the original document MS, after the discharge detector 61 detects the leading edge of the original document MS, the timing at which the original document MS arrives at the second stationary reading unit 95 is estimated based on the pulse count of the reading motor 103. Then, at the estimated timing, the controller 100 transmits, to the apparatus body controller 111, a gate signal indicating an effective image area of the second side of the original document MS in the sub-scanning direction. The transmission of the gate signal is continued until the trailing edge of the original document MS exits from the second reading position by the second stationary reading unit 95, and the second stationary reading unit 95 reads image data on the second side of the original document MS.

The second stationary reading unit 95 includes a contact-type image sensor (CIS), and its reading surface is coated to prevent pasty substances from being transferred to the reading surface of the CIS even if such substances are present on the surface on the original document MS. Thus, detective reading resulting in vertical lines can be prevented. In addition, the support roller 96 is provided at a position facing the second stationary reading unit 95 via the conveyance route through which the original document MS travels to support the original document MS from the side (first side) that is not read by the second stationary reading unit 95. The support roller 96 prevents floating of the original document MS at a position where the second stationary reading unit 95 reads the image data thereof and serves as a white base for acquiring shading data in the second stationary reading unit 95.

Next, distinctive features of the present embodiment are described below.

Figure 8:
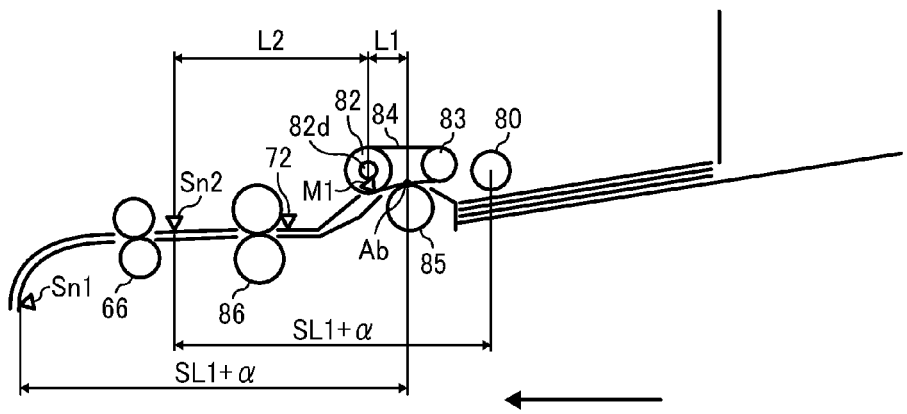
FIG. 8 is a schematic view of a document set section, a separation section, a registration section, and a part of a turning section of the ADF.

FIG. 8 is a schematic view of the document set section A, the separation section B, the registration section C, and a part of the turning section D of the ADF.

As shown in FIG. 8, the ADF 51 according to the present embodiment includes the first and second leading-edge detectors Sn1 and Sn2 to detect the leading edge of the original document MS. The leading-edge detector Sn2 is positioned upstream from the leading-edge detector Sn1 in the sheet conveyance direction. The leading-edge detectors Sn1 and Sn2 can be reflective or transmission-type photosensors.

The first leading-edge detector Sn1 is disposed downstream in the sheet conveyance direction from the separation nip Ab by the distance equal to the sum of a length in the sheet conveyance direction of specific sheet size (in the present embodiment, the length of letter size placed sideways: 216 mm) and a necessary margin α. That length of the specific sheet size is hereinafter referred to as "sheet length SL1".

It is to be noted that, in this specification, "sheet length" means the length of original documents or sheets in the sheet conveyance direction unless otherwise specified, and the specific sheet size is a frequently used sheet size such that processing productively is expected to increase. Although the specific sheet size in the present embodiment is sideways letter size, it is not limited thereto.

For example, it is possible that the leading edge of the subsequent sheet projects downstream from the separation nip Ab. Therefore, the margin α is decided in view of the amount by which the subsequent sheet projects from the separation nip Ab, tolerances in the position of the first leading-edge detector Sn1, and tolerances in detection by the detector, that is, detection capability and mechanical tolerance of the detector, typically.

The first leading-edge detector Sn1 is disposed such that, in the case of the specific sheet size, it is certain that the trailing end of that sheet has exited from the separation portion (contact portion between the conveyance belt 84 and the reverse roller 85) when the first leading-edge detector Sn1 detects the leading edge of that sheet.

The second leading-edge detector Sn2 is disposed downstream in the sheet conveyance direction (conveyance path) from the pickup roller 80 by the distance equal to the sum of the sheet length SL1 and a necessary margin α. The margin α is decided in view of tolerances in the position of the second leading-edge detector Sn2 and detection by the document size detectors described later. The second leading-edge detector Sn2 is disposed such that, in the case of the specific sheet size (e.g., sideways letter size), it is certain that the trailing end of that sheet has exited from the pickup roller 80 when the second leading-edge detector Sn2 detects the leading edge of that sheet.

Additionally, the trailing-edge detector M1 having capability of sheet length detection is provided adjacent to the separation nip Ab.

It is to be noted that reference character 82a shown in FIG. 8 represents a driving shaft of the driving roller 82. Additionally, hereinafter a length of the conveyance path from the separation nip Ab to the trailing-edge detector M1 is referred to as first conveyance distance L1, a length obtained by deducting the first conveyance distance L1 from the specific sheet length SL1 is referred to as a length SL1-L1, and a length of the conveyance path from the trailing-edge detector M1 to the second leading-edge detector Sn2 is referred to as second conveyance distance L2. It is to be noted that the relative lengths of the specific sheet length SL1 and the first and second conveyance distances L1 and L2 are not limited to the relative lengths (L1<L2<SL1) shown in the configuration shown in FIG. 8.

Figure 9:
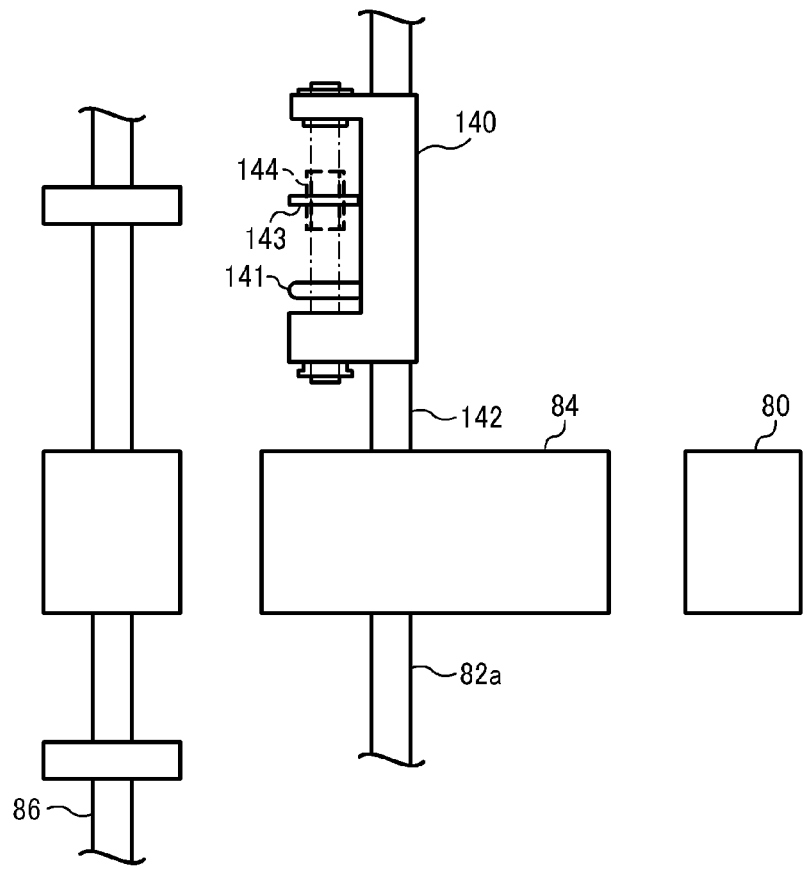
FIG. 9 is a plan view illustrating a trailing-edge detector and an adjacent configuration.
Figure 10:
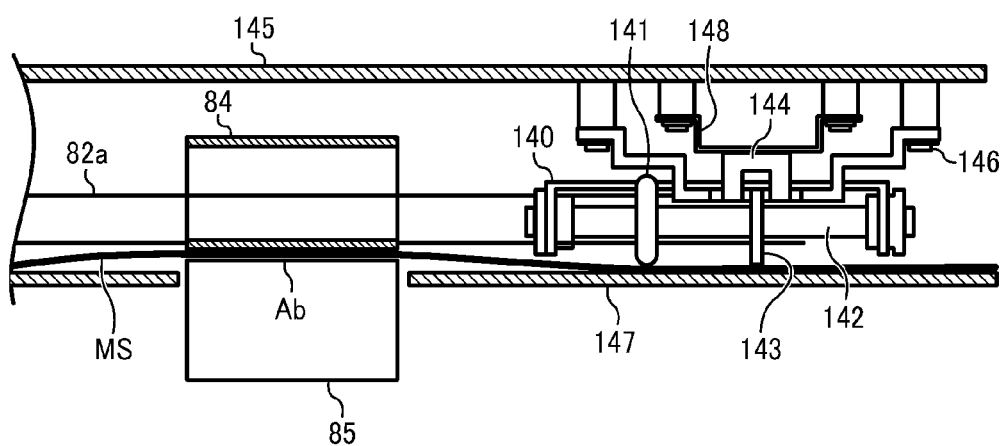
FIG. 10 is a cross-sectional view illustrating the trailing-edge detector.

FIG. 9 is a plan view illustrating the trailing-edge detector M1 and the adjacent configuration, and FIG. 10 is a cross-sectional view illustrating the trailing-edge detector M1.

As shown in FIGS. 9 and 10, the trailing-edge detector M1 includes a sensor arm 140 rotatably attached to the driving shaft 82a of the driving roller 82 to drive the conveyance belt 84, a roller shaft 142 rotatably supported by the sensor arm 140, a detection roller 141 fitted around the roller shaft 142, an encoder wheel 143, and a photosensor 144. The detection roller 141 can serve as a rotary follower. The encoder wheel 143 engages the roller shaft 142 to move in synchronization with the detection roller 141. The photosensor 144 can be, for example, transmission type, and attached to a feeding-section cover 145 via a sensor bracket 148. A sensor cover 146 covers the photosensor 144.

The detection roller 141 is rotatably supported by the driving shaft indirectly via the sensor arm 140 and accordingly contacts the original document MS under its own weight. Alternatively, the trailing-edge detector M1 may be urged toward the original document MS, thereby causing the detection roller 141 to contact the original document MS. With this configuration, the detection roller 141, rotatably supported by the sensor arm 140 via the roller shaft 142, and the encoder wheel 143 can rotate in response to the movement of the original document MS in the sheet conveyance direction.

Multiple transmission holes are formed in the surface of the encoder wheel 143, spaced at predetermined intervals in the circumferential direction. When any of the transmission holes is at a position facing the photosensor 144, a light-receiving portion of the photosensor 144 receives the light emitted from a light-emitting portion thereof, and the photosensor 144 outputs an ON signal to the controller 100. By contrast, when none of the transmission holes of the encoder wheel 143 faces the photosensor 144, the encoder wheel 143 blocks the light from the light-emitting portion of the photosensor 144. Accordingly, the light-receiving portion of the photosensor 144 does not receive light, and the photosensor 144 outputs an OFF signal to the controller 100. Consequently, while the detection roller 141 rotates, following the original document MS being transported, the controller 100 receives ON-OFF signals (hereinafter "pulse signals") output at regular intervals from the photosensor 144. By contrast, when the detection roller 141 stays motionless, the controller 100 receives either ON signal or OFF signal consecutively (hereinafter "continuous signal"). Thus, the controller 100 can determine whether the detection roller 141 is rotating or motionless by monitoring the signal from the photosensor 144. In other words, the encoder wheel 143, the photosensor 144, and the controller 100 together form a rotation detector to detect rotation of the detection roller 141 serving as the rotary follower.

Detection of the trailing edge of sheets in a comparative sheet conveyance device is described below.

The comparative sheet conveyance device also includes a leading-end detector to detect the leading edge of the sheet at a predetermined position in the conveyance path. The leading-end detector is positioned to detect the leading edge of a specific size sheet immediately after the sheet exits from the separation nip Ab. The comparative sheet conveyance device further includes a reflection-type or transmission-type photosensor disposed adjacent to but at a given distance from the exit of the separation nip Ab serving as a trailing end detector to detect the trailing end of the sheet (hereinafter "trailing end photosensor").

The comparative sheet conveyance device further includes a sheet length detector disposed upstream from the image reading position to detect the length of the initial sheet. Specifically, the sheet length can be calculated based on the duration of time from when the sheet length detector detects the sheet to when the trailing end photosensor detects passage of the trailing end thereof. In the comparative sheet conveyance device, when the sheet size of the initial sheet is deemed the specific sheet size, feeding of the subsequent sheet is started when the leading-end detector detects the leading edge of the preceding sheet. By contrast, when the sheet is deemed longer or shorter than the specific sheet size, feeding of the subsequent sheet is started when the trailing end photosensor detects the trailing end of the preceding sheet. With this control, in the case of specific sheet size, intervals between sheets can be reduced.

The reflection-type or transmission-type photosensor serving as the trailing-end detector directs light onto a surface of the sheet to detect its presence, thereby determining whether its trailing end has passed by the detection position. However, when photosensors are used, it is difficult to detect passage of the trailing end of the sheet immediately due to the following causes, and reduction in intervals between sheets is not sufficient.

In the case of punched sheets, the trailing-end photosensor does not recognize the presence of the sheet when the punch hole is at the detection position. Thus, the sheet is not detected temporarily. Therefore, erroneous detection will occur in conveyance of punched sheets if the trailing-end photosensor is configured to determine that the trailing end of the sheet has passed by the detection position immediately when the photosensor stops detecting the sheet.

To prevent such erroneous detection resulting from punch holes, the controller is configured to check whether the trailing-end photosensor detects again the sheet within a predetermined period after it stops detecting the sheet. Consequently, the configuration using the trailing-end photosensor cannot recognize the passage of the sheet immediately.

The trailing-end detector M1 according to the present embodiment is configured to overcome the above described difficulties.

Figure 11:
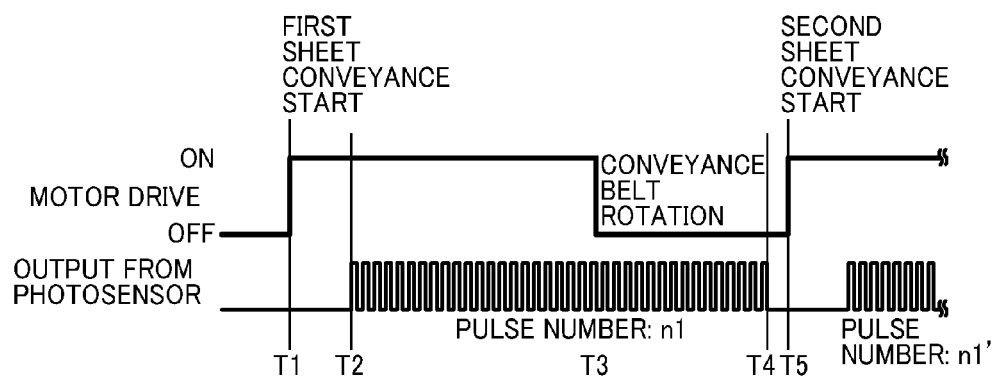
FIG. 11 is a timing chart for a case in which skew correction by a pair of pullout rollers is not performed.
Figure 12:
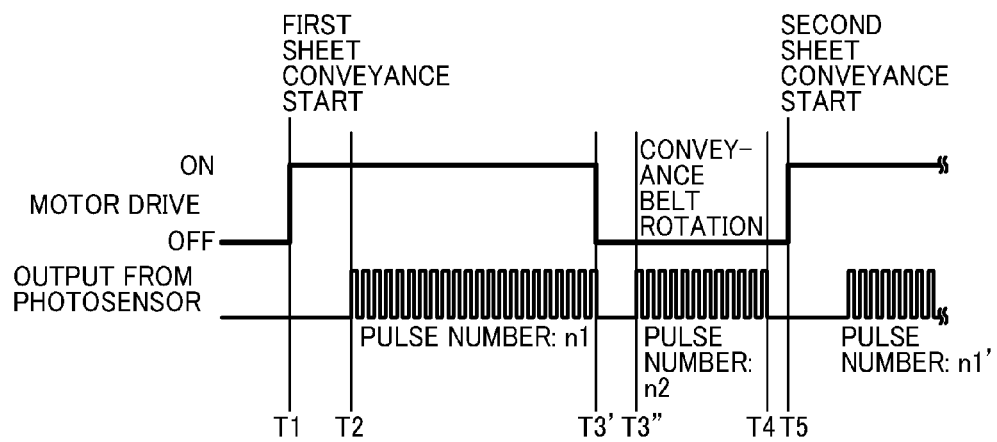
FIG. 12 is a timing chart for a case in which skew correction by the pair of pullout rollers is performed.

FIG. 11 is a timing chart for a case in which skew correction by the pair of pullout rollers 86 is not performed, and FIG. 12 is a timing chart for a case in which skew correction is performed. It is to be noted that, in FIGS. 11 and 12, reference character T1 represents start timing of conveyance of an initial sheet, and T3 represents start timing of rotation of the conveyance belt 84.

Referring FIG. 11, in the case in which skew is not corrected with the pair of pullout rollers 86, when the leading-end portion of the original document MS (hereinafter also "sheet MS") reaches the detection roller 141 at time point T2, the detection roller 141 starts rotating, following the sheet MS. Simultaneously, at time point T2, the output from the photosensor 144 switches from the continuous signal to the pulse signal. At time point T4 at which the trailing edge of the sheet MS exits from the detection roller 141, the detection roller 141 stops rotating. Thus, the output from the photosensor 144 switches from the pulse signal to the continuous signal at time point T4. By monitoring switching of the output from the photosensor 144 from the pulse signal to the continuous signal, it can be detected that the trailing edge of the sheet MS has arrived at the trailing-edge detector M1.

Additionally, in the present embodiment, the length in the sheet conveyance direction of the sheet MS is detected using the trailing-edge detector M1. As described above, by monitoring switching from the continuous signal to the pulse signal (at T2), it can be detected that the leading edge of the sheet MS has arrived at the detection roller 141 of the trailing-edge detector M1. It is to be noted that, in this specification, detection of the arrival of the leading edge or trailing edge of the sheet at the detector may be simply referred to as detection of leading edge or trailing edge of the sheet.

When the leading edge of the sheet MS is thus detected at time point T2, a counter connected to the controller 100 counts the number (quantity) of pulse signals (hereinafter "pulse number n1") output from the photosensor 144 until the trailing edge of the sheet MS is detected at time point T4. It is to be noted that a single ON-OFF signal is deemed a single pulse. Then, the controller 100 calculates the length (in millimeters) in the sheet conveyance direction of the sheet MS, which can be expressed as n1×(πR/n), using the counted pulse number n1, a diameter R (in millimeters) of the detection roller 141, and the number of pulses necessary for the detection roller 141 to complete one revolution (hereinafter "necessary pulse number n"). The necessary pulse number n equals the quantity of the transmission holes of the encoder wheel 143 detected by the photosensor 144. Thus, the length in the sheet conveyance direction of the sheet MS can be computed using the trailing-edge detector M1.

By contrast, referring to FIG. 12, in the case in which skew is corrected with the pair of pullout rollers 86, at time point T3' the leading edge of the sheet MS is caused to get stuck in the nip between the pullout rollers 86, thereby stopping and slackening the sheet MS. Accordingly, the detection roller 141 suspends rotation at time point T3' as shown in FIG. 12. It is to be noted that the detection roller 141 stops either when skew correction is executed or when no sheet MS is present at the trailing-edge detector M1. Therefore, at that time, it is necessary to ascertain which of the two causes, skew correction or absence of the sheet MS at the trailing-edge detector M1, has caused the detection roller 141 to stop, and it can be done by detecting whether the feed motor 102 is ON or OFF electrically in the present embodiment.

Specifically, when the feed motor 102 is ON (driving) and the output from the photosensor 144 has switched to the pulse signal from the continuous signal, it is deemed that the leading edge of the sheet MS has reached the trailing-edge detector M1. When the output from the photosensor 144 has switched to the continuous signal from the pulse signal at a timing at which the feed motor 102 is turned OFF from ON (at T3'), it is deemed that the detection roller 141 has stopped for skew correction. Further, when the output from the photosensor 144 has switched to the pulse signal from the continuous signal while the feed motor 102 is OFF (at T3"), it is deemed that the detection roller 141 has resumed rotation after skew correction. When the output from the photosensor 144 has switched to the continuous signal from the pulse signal while the feed motor 102 is OFF at time point T4, it is deemed that the detection roller 141 stops rotating because the trailing edge of the sheet has exited from the trailing-edge detector M1.

Alternatively, in addition to or instead of the driving of the feed motor 102, whether the detection roller 141 is stopped due to skew correction or absence of the sheet MS at the trailing-edge detector M1 may be determined based on the driving state (ON or OFF) of the pullout motor 113 for driving the pair of pullout rollers 86. For example, when the detection roller 141 stops while both the pullout motor 113 and the feed motor 102 are OFF, it can be deemed that the detection roller 141 is stopped for skew correction. When the detection roller 141 stops while the pullout motor 113 is ON but the feed motor 102 is OFF, it can be deemed that the trailing edge of the sheet MS has exited from the trailing-edge detector M1. Further, when rotation of the detection roller 141 is detected while the feed motor 102 is ON, it can be deemed that the leading edge of the sheet MS has reached the trailing-edge detector M1. When rotation of the detection roller 141 is detected while the feed motor 102 is OFF, it can be deemed that sheet conveyance has resumed after screw correction.

As described above, in the case in which sheet conveyance is suspended for skew correction, the length (in millimeters) in the sheet conveyance direction of the sheet MS can be expressed as (n1+n2)×π(R/n) using the counted pulse number n1 before skew correction, the number of pulse signals output from the photosensor 144 after skew correction (counted pulse number n2), the diameter R of the detection roller 141, and the necessary pulse number n.

Although, in the present embodiment, the sheet length is calculated using the diameter R (mm) of the detection roller 141, the necessary pulse number n for one revolution of the detection roller 141, the pulse number n1, and the sum of the pulse quantities n1 and n2 (n1+n2), the sheet length may be calculated using only the pulse number n1, and the sum of the pulse quantities n1 and n2 because the diameter R of the detection roller 141 and the necessary pulse number n are specified values.

Additionally, in the present embodiment, when the trailing edge of the sheet MS has exited from the trailing-edge detector M1, it can be immediately recognized because the trailing end detection is based on the switching from the pulse signal to the continuous signal. That is, while the detection roller 141 rotates together with the sheet MS, the controller 100 receives the pulse signal at a predetermined timing from the photosensor 144. Accordingly, it can be deemed that the trailing edge of the sheet MS has exited from the trailing-edge detector M1 if the controller 100 does not receive the pulse signal at the predetermined timing. That is, the predetermined timing means a single pulse after the trailing end of the document MS exits from the trailing-edge detector M1. Since the amount (distance) by which the sheet is transported during one pulse is very small, that timing can be approximated to the time point immediately after the trailing edge of the sheet MS has exited from the trailing-edge detector M1. Additionally, even if punch holes are fainted in the sheet MS, the detection roller 141 does not stop because the detection roller 141 contacts an area of the sheet MS without punch holes and is rotated thereby. Therefore, erroneous detection can be avoided even if it is determined that the trailing edge of the sheet MS has exited when the pulse signal is not received at the predetermined timing. Accordingly, it is not necessary to wait, for example, several seconds to decide whether the trailing edge of the sheet MS is detected and monitor the output from the photosensor 144 for several seconds after the pulse signal at the predetermined timing is stopped. Consequently, without erroneous detection resulting from punch holes, passage of the trailing edge of the sheet MS can be recognized immediately after the trailing edge of the sheet MS has exited from the trailing-edge detector M1.

It is to be noted that it is preferred that the detection roller 141 be disposed downstream from the separation nip Ab in the sheet conveyance direction and, to attain the following advantage, as close as possible to the separation nip Ab. If the detection roller 141 is positioned upstream from the separation nip Ab, the trailing edge of the sheet MS has not yet exited from the separation nip Ab when the trailing-edge detector M1 detects the trailing edge of the sheet MS. Accordingly, conveyance of subsequent sheets must be controlled in a more complicate manner. Specifically, it is necessary to measure time or driving amount after the trailing-edge detector M1 detects the trailing end of the preceding sheet and then start conveyance of the subsequent sheet when the measured time or driving amount has reached a predetermined amount. Similarly, this control should be employed also when the detection roller 141 is disposed at the same or similar position as the separation nip Ab. This control is necessary because it is possible that the subsequent sheet is transported together with the preceding sheet, and the leading edge of the subsequent sheet can slightly project beyond the separation nip Ab. Accordingly, if conveyance of the subsequent sheet is started when the trailing-edge detector M1 detects the trailing end of the preceding sheet (immediately after the trailing end of the preceding sheet has exited from the separation nip Ab), multifeed might occur. That is, the trailing end portion of the preceding sheet and the leading-end portion of the subsequent sheet are superimposed one on the other and conveyed together. Thus, the above-described conveyance control is necessary to prevent multifeed in configurations in which the detection roller 141 is disposed at the same or similar position as the separation nip Ab.

By contrast, in the configuration in which the detection roller 141 is positioned downstream from the separation nip Ab, the above-described multifeed does not occur even if conveyance of the subsequent sheet is started simultaneously when the trailing-edge detector M1 detects the trailing edge of the sheet MS. Accordingly, this control can alleviate measurement of time or driving amount after the trailing-edge detector M1 detects the trailing end of the preceding sheet, thus streamlining sheet conveyance control.

It is to be noted that, although the trailing-edge detector M1 is used to detect the length of the sheet MS in the sheet conveyance direction in the present embodiment, alternatively, one of other existing detectors such as the leading-edge detectors Sn1 and Sn2, and the contact detector 72 may be used. Yet alternatively, a detector dedicated for sheet length detection (e.g., sheet length detector 57 or 58) may be provided in the sheet conveyance path.

Next, sheet feeding control according to the present embodiment is described in further detail below.

Figure 13A:
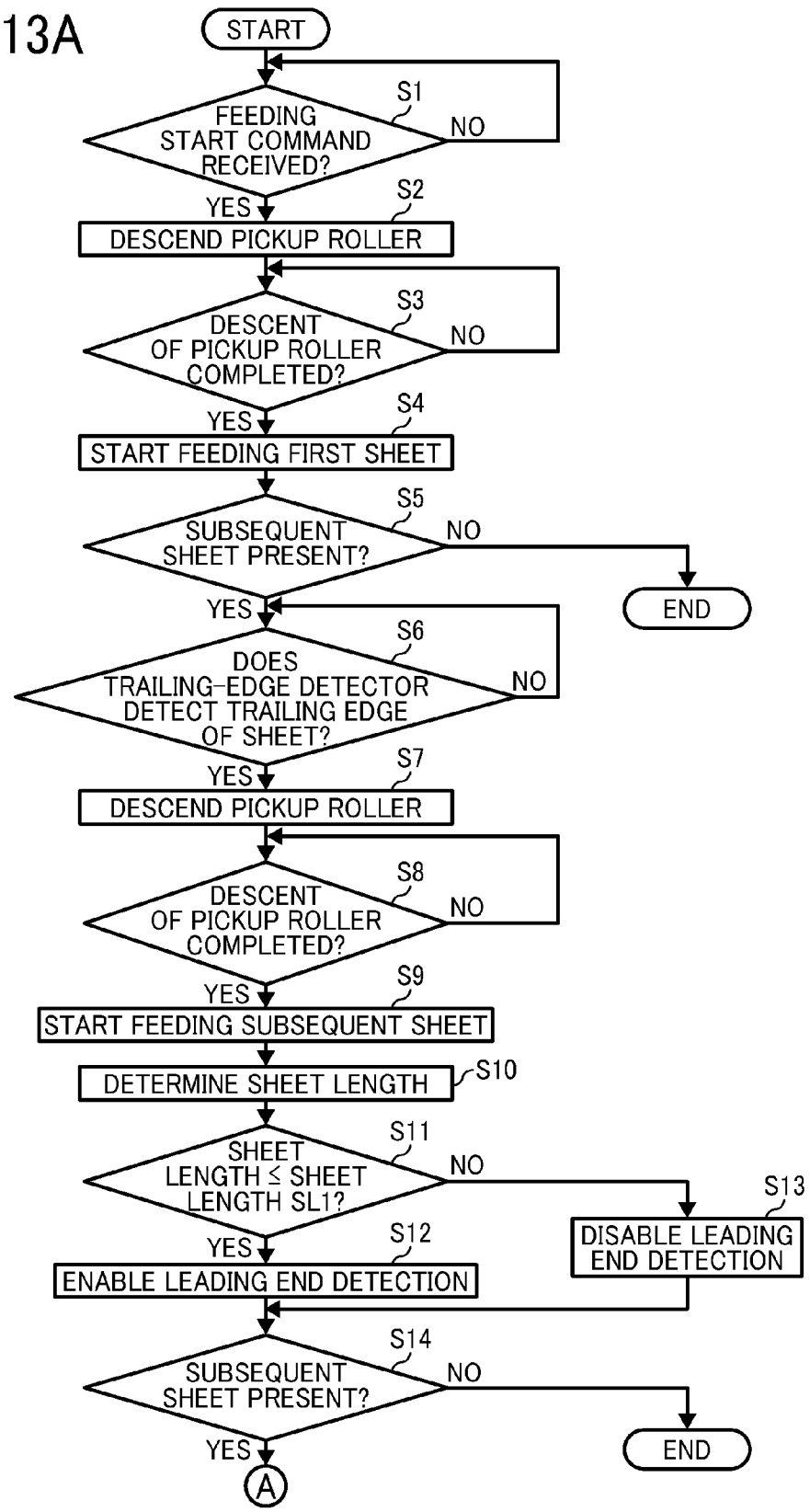
FIG. 13A is a flowchart for controlling feeding start of first and second sheets.

FIGS. 13A and 13B are flowcharts illustrating control flow of sheet feeding start.

As shown in FIG. 13A, at S1, the controller 100 determines whether a feeding start command is received from the apparatus body controller 111 via the I/F 107. When the feeding start command is received (Yes at S1), at S2 the pickup roller 80 starts descending as a preparation for sending out a first sheet. It is to be noted that descent of the pickup roller 80 is hereinafter also referred to as sheet feeding preparation. After descent of the pickup roller 80 is completed (Yes at S3), feeding of the first sheet (hereinafter also "preceding sheet") is started at S4.

At S5, the controller 100 checks whether any subsequent sheet is present. When one or more subsequent sheets are present (Yes at S5), the sheet length in the sheet conveyance direction is detected by the trailing-edge detector M1. At S6, the controller 100 checks whether the trailing-edge detector M1 detects the trailing edge of the preceding sheet. When the trailing-edge detector M1 detects the trailing edge of the first sheet (Yes at S6), at S7 the pickup roller 80 starts descending as a preparation for sending out the subsequent sheet (i.e., the second sheet). After descent of the pickup roller 80 is completed (Yes at S8), feeding of the second sheet is started at S9. Thus, feeding control of the initial two sheets of a bundle of originals is completed. As things turned out, feeding of the second sheet is started when the trailing edge of the first sheet is detected by the trailing-edge detector M1 regardless of the size of the first sheet.

Additionally, the sheet length in the sheet conveyance direction is calculated based on the number of pulses after the trailing edge of the first sheet exits the trailing-edge detector M1. Thus, at S10 the sheet length in the sheet conveyance direction is determined. After the sheet length in the sheet conveyance direction is thus determined, at S11 the controller 100 checks whether the sheet length is equal to or shorter than the sheet length SL1 of the specific sheet size. In the case in which the sheet length is longer than the sheet length SL1 (No at S11), at S13 leading end detection by the leading-edge detectors Sn1 and Sn2 is disabled. In the case in which the sheet length is not longer than the sheet length SL1 (Yes at S11), leading end detection by the leading-edge detectors Sn1 and Sn2 is made effective at S12. At S14 the controller 100 checks whether any subsequent sheet (i.e., a third sheet) is present. When the third sheet is present (Yes at S14), the process proceeds to S15A in FIG. 13B. When there is no sheets remaining (No at S14), the process is completed.

As described above, in the present embodiment, feeding start timing of the third sheet and subsequent sheets is controlled according to the length of the first sheet. In other words, in the case of sequential reading of a bundle of original documents, the sheet length is detected only once, that is, the sheet length of only the first sheet is detected at the start of the sequential reading, and the detected sheet length is used to determine the feeding start timing in the sequential sheet feeding. Alternatively, sheet size obtained in conveyance of each sheet may be used to determine the feeding start timing. Specifically, based on the sheet size of the sheet whose ordinal number is N, when to start descending of the pickup roller 80 to feed the sheet whose ordinal number is N+2 can be determined.

FIG. 13B is a timing chart for controlling feeding start of the third and subsequent sheets.

Referring to FIG. 13B, the controller 100 monitors the second leading-edge detector Sn2 (i.e., "an upstream leading-edge detector") and the trailing-edge detector M1. At S15A, when the second leading-edge detector Sn2 detects the leading edge of the sheet (Yes at S15A), the controller 100 checks whether leading end detection is effective at S15B. When the leading end detection by the second leading-edge detector Sn2 is effective (Yes at S15B), at S17A descent of the pickup roller 80 is started. Simultaneously, at S23, defective conveyance detection (shown in FIG. 14) is started. Thus, when the second leading-edge detector Sn2 detects the leading edge of the sheet before the trailing-edge detector M1 detects the trailing edge thereof, descent of the pickup roller 80 is started in response to detection of the leading edge of the sheet by the second leading-edge detector Sn2.

By contrast, when the trailing-edge detector M1 detects the trailing edge of the sheet before the second leading-edge detector Sn2 detects the leading edge of the sheet (No at S15A and Yes at S16), descent of the pickup roller 80 is started at S17B in response to the trailing-edge detector M1 detecting the trailing edge of the sheet. Similarly, in the case in which leading end detection is disabled (No at S15B), descent of the pickup roller 80 is started at 517B in response, to the trailing-edge detector M1 detecting the trailing edge of the sheet.

When descent of the pickup roller 80 is started at S17B in response to the trailing end detection made by the trailing-edge detector M1, the process proceeds to S20, and the controller 100 checks whether the descent of the pickup roller 80 has completed. When the descent of the pickup roller 80 has completed. (Yes at S20), sheet feeding is started at S21.

By contrast, in the case in which descent of the pickup roller 80 is started at S17A in response to the leading end detection made by the second leading-edge detector Sn2, it means that the trailing-edge detector M1 has not yet detected the trailing edge of the sheet. Then, at S18 and S19 the controller 100 monitors the first leading-edge detector Sn1 and the trailing-edge detector M1. When the first leading-edge detector Sn1 detects the leading edge of the sheet before the trailing-edge detector M1 detects the trailing edge of the sheet and leading end detection is effective (Yes at S18), at S24 defective conveyance detection is started. Further, at S21 feeding of the subsequent sheet is started in response to the leading end detection by the first leading-edge detector Sn1.

By contrast, when the trailing-edge detector M1 detects the trailing edge of the sheet before the first leading-edge detector Sn1 detects the leading edge of the sheet (No at S18 and Yes at S19), at S21 feeding of the subsequent sheet is started in response to the trailing end detection by the trailing-edge detector M1.

By controlling feeding start of the third and subsequent sheets as shown in FIG. 13B, intervals between sheets of specific sheet size (i.e., specific size sheets) can be reduced in sheet feeding. Additionally, increases in intervals between sheets shorter than the specific sheet size can be restricted. Moreover, multifeed can be prevented in conveyance of sheets longer than the specific sheet size.

It is to be noted that, although the control flow shown in FIG. 13B includes both of starting sheet feeding preparation in response to leading end detection by the second leading-edge detector Sn2 (steps S15A to S17B) and starting sheet feeding in response to leading end detection by the first leading-edge detector Sn1 (steps S18 to S21), only one of them may be performed depending on the configuration of the device, usage conditions, or the like. In such a case, steps at S15A and S15B or a step at S18 can be omitted, and the process proceeds to the step selected when the determination is "No".

Additionally, the image reading unit 50 may be configured to allow the user to select "mixed-size loading mode". Users may place a bundle of original documents that is a mixture of sheets different in length in the sheet conveyance direction on the document table 53. If, for example, the first sheet (on the top of) the bundle is shorter than the sheet length SL1, and the third or any of thereafter is longer than the sheet length SL1, it is possible that the sheet longer than the sheet length SL1 overlaps the subsequent sheet (i.e., multifeed), resulting in jamming of sheets or damage to sheets. The mixed-size loading mode is advantageous when the bundle of sheets set on the document table 53 includes a sheet longer than the sheet length SL1 and a sheet having a length equal to or shorter than the sheet length SL1. When the mixed-size loading mode is selected, the trigger for sheet feeding is trailing end detection by the trailing-edge detector M1 regardless of the length of the sheet length. For example, the user can select or the cancel mixed-size loading mode on the operation panel 108.

Figure 14:
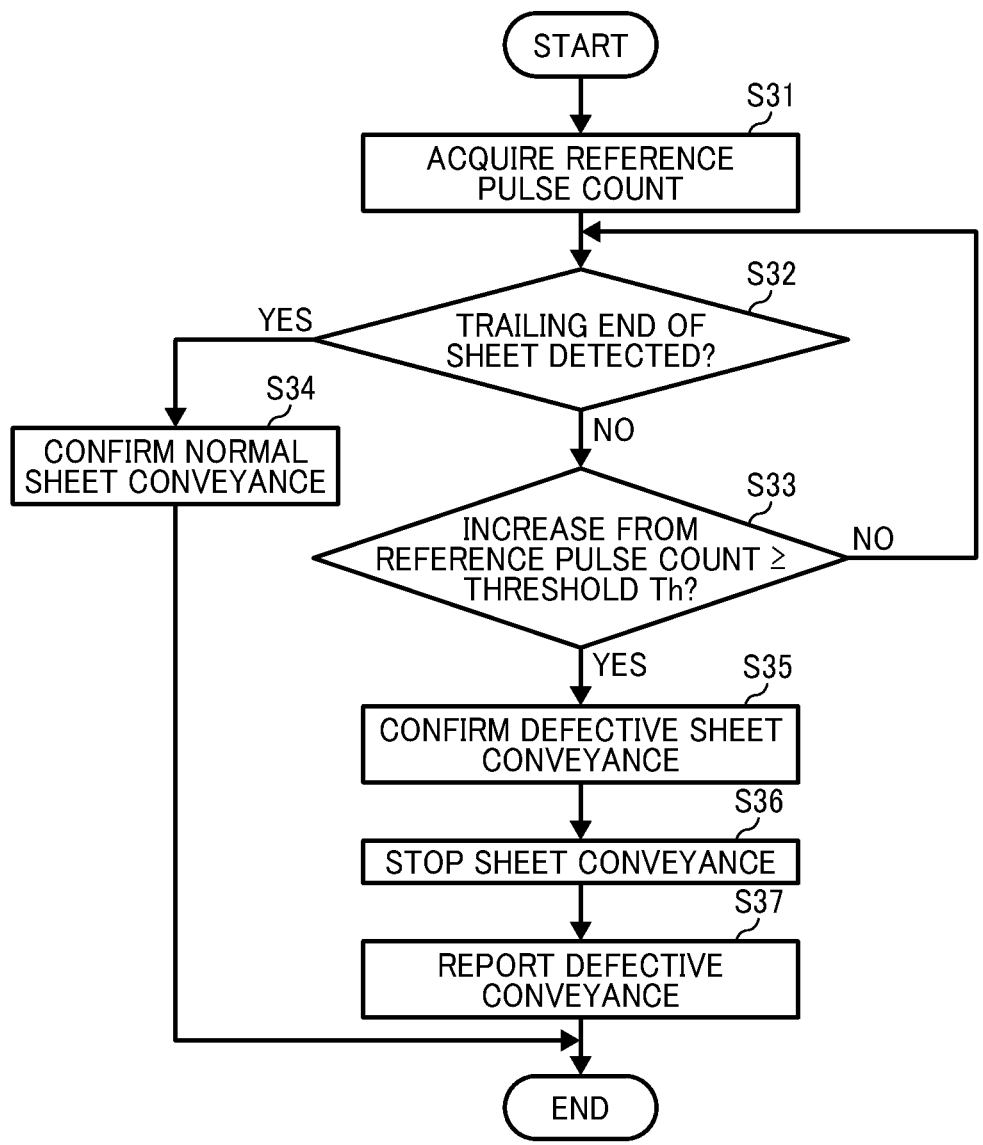
FIG. 14 is a flowchart of defective conveyance detection.

Next, defective conveyance detection in the control flow shown in FIG. 14 is described below with reference to FIG. 14.

When the leading end detection is enabled, that is, the sheet is not greater than the sheet length SL1, the trailing-edge detector M1 should detect the trailing edge of the sheet MS within a predetermined period of time after the leading-edge detector Sn1 or Sn2 detects the leading end thereof. If the trailing-edge detector M1 does not detect the trailing edge of the sheet within the predetermined period of time, it is suspected that the user has not yet designated mixed-size loading mode when a mixture of sheets longer and shorter than the specific sheet size is placed in the ADF 51, or sheet size detection is erroneous because of malfunction of the trailing-edge detector M1. If the leading end detection is enabled in conveyance of sheets longer than the specific sheet size (sheet length SL1), skew or multifeed can occur as described above. Therefore, in the present embodiment, defective conveyance detection is performed to check whether sheets longer than the specific sheet size are fed although the leading end detection is enabled and leading-edge detector Sn1 or Sn2 is used to determine when to start sheet feeding or sheet feeding preparation.

When the leading end detection is enabled and the leading-edge detector Sn1 or Sn2 detects the leading edge of the sheet, the sequence shown in FIG. 14 is invoked and performed in parallel to the processes shown in FIG. 13B.

When the defective conveyance detection is triggered by leading end detection by the leading-edge detector Sn1 or Sn2, at S31 the pulse count at that time (i.e., current pulse count) of the driving motor (feed motor 102 or pullout motor 113) is acquired and stored as a reference pulse count in a memory of the controller 100. At S32, the controller 100 monitors the trailing-edge detector M1. If the trailing-edge detector M1 detects the trailing edge of the sheet MS before the increase in pulse count from the reference pulse count reaches the threshold Th (Yes at S32), at S34 the controller 100 deems that the document sheet conveyance is proper.

By contrast, if the trailing-edge detector M1 does not detect the trailing edge of the sheet MS (No at S32) even when the increase in pulse count from the reference pulse count acquired at S31 reaches the threshold Th (Yes at S33), the controller 100 determines that sheet conveyance is defective at S35. That is, the controller 100 deems that the sheet being fed is longer than the specific size in the sheet conveyance direction although the leading end detection is enabled. In this case, there is a risk of occurrence of multifeed or skew. Accordingly, at S36 the controller 100 stops the respective driving motors used in sheet conveyance to stop sheet conveyance. In addition, the controller 100 reports the defective conveyance to the apparatus body controller 111 via the I/F 107. At S37, the apparatus body controller 111 causes the operation panel 108 to report a possibility of malfunction of the trailing-edge detector to users or improper conveyance mode. The operation panel 108 may display a message to urge the user to check whether mixed-size loading mode is selected. Thus, the operation panel 108 can serve as a report unit.

In a case in which the defective conveyance detection is triggered by the detection result generated by the second leading-edge detector Sn2, the threshold Th is the sum of the drive pulse count of the driving motor (feed motor 102 or pullout motor 113) necessary to transport the sheet from the pickup roller 80 to the detection position of the trailing-edge detector M1 and a margin in view of fluctuations in detection or the like. In a case in which the defective conveyance detection is triggered by the detection result generated by the first leading-edge detector Sn1, the threshold Th is the sum of the drive pulse count of the driving motor (feed motor 102 or pullout motor 113) necessary to transport the sheet from the separation nip Ab to the detection position of the trailing-edge detector M1 and a margin.

It is to be noted that, in FIG. 14, although the defective conveyance detection is triggered by both the detection results by the second leading-edge detector Sn2 and that by the first leading-edge detector Sn1, the defective conveyance detection may be triggered by only one of them.

Thus, with the above-described defective conveyance detection, sheets longer than the specific sheet size are not fed when the leading end detection is effective even if there is failure or malfunction of the trailing-edge detector M1, or sheet conveyance mode is improper. As a result, occurrence of multifeed and skew can be restricted.

Sheet conveyance control of the third sheet and thereafter according to sheet length is described in further detail below with reference to FIGS. 13A, 13B, and 15 through and 19.

Figure 15:
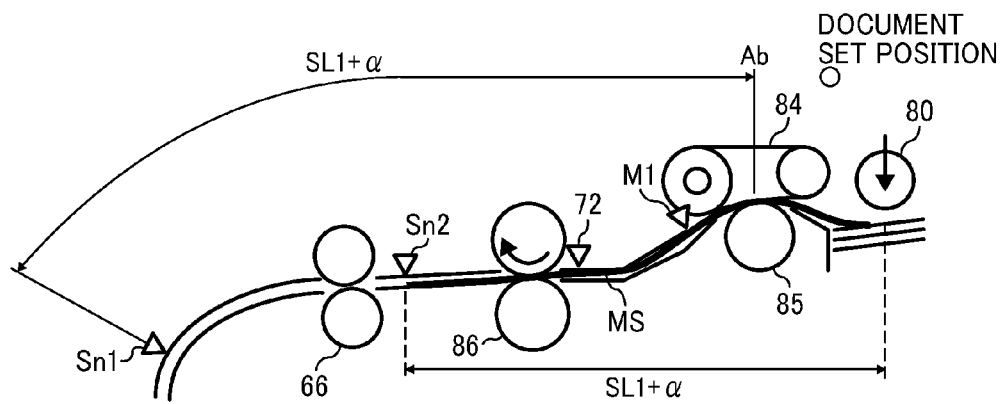
FIG. 15 illustrates a state in which a leading edge of a specific size sheet is at a second leading-edge detector.

Referring to FIG. 15, in the case of the specific sheet size (sheet length SL1), the leading edge of the specific size sheet MS reaches the second leading-edge detector Sn2 before the trailing end thereof exits from the trailing-edge detector M1. In this case, leading end detection by the leading-edge detectors Sn1 and Sn2 is made effective (at S12 in FIG. 13A). Accordingly, in the case of specific sheet size, when the second leading-edge detector Sn2 detects the leading edge of the sheet MS (Yes at S15B in FIG. 13B), descent of the pickup roller 80 is started (at S17A). At that time, as shown in FIG. 15, the trailing edge of the sheet MS is positioned downstream from the position facing the pickup roller 80 in the sheet conveyance direction. Therefore, the pickup roller 80 does not contact the preceding sheet even if descent of the pickup roller 80 is started when the second leading-edge detector Sn2 detects the leading edge of the preceding sheet. Accordingly, intervals between the specific size sheets MS can be reduced by starting descent of the pickup roller 80 in response to leading end detection by the second leading-edge detector Sn2 compared with a method of descending of the pickup roller 80 in response to the trailing end detection by the trailing-edge detector M1.

Figure 16:
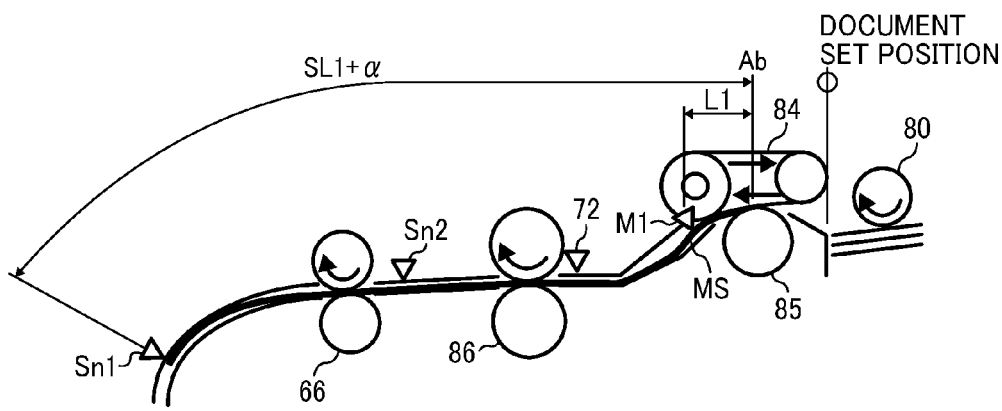
FIG. 16 illustrates a state in which the leading edge of the specific size sheet is at a first leading-edge detector.

Additionally, as shown in FIG. 16, the leading edge of the specific size sheet MS reaches the first leading-edge detector Sn1 (Yes at S18 in FIG. 13B) before the trailing end thereof exits from the trailing-edge detector M1. Accordingly, in the case of specific sheet size, feeding of the subsequent sheet is started (at S21 in FIG. 13B) in response to the leading end detection by the first leading-edge detector Sn1. When the leading edge of the sheet MS reaches the first leading-edge detector Sn1, the trailing end thereof is positioned slightly downstream from the separation nip Ab. More specifically, the trailing edge of the sheet MS is at a position not to overlap with the leading edge of the subsequent sheet even if the leading edge of the subsequent sheet projects from the separation nip Ab. Therefore, in the case of the specific sheet size, multifeed does not occur even if feeding of the subsequent sheet is started when the first leading-edge detector Sn1 detects the leading edge of the sheet MS. Moreover, intervals between sheets can be reduced compared with the method in which feeding of the subsequent sheet is started when the trailing-edge detector M1 detects the trailing edge of the sheet MS.

It is to be noted that although the description above concerns conveyance of specific size sheets, in the case of the sheet length greater than sheet length SL1 minus the first conveyance distance L2 (from the separation nip Ab to the trailing-edge detector M1) and equal to or less than the sheet length SL1, sheet feeding preparation is triggered by leading end detection by the second leading-edge detector Sn2, and sheet feeding is triggered by leading end detection by the first leading-edge detector Sn1. In other words, the sheet length greater than the length SL1-L2 and equal to or less than the sheet length SL1 is regarded as predetermined reference length (reference range).

Figure 17:
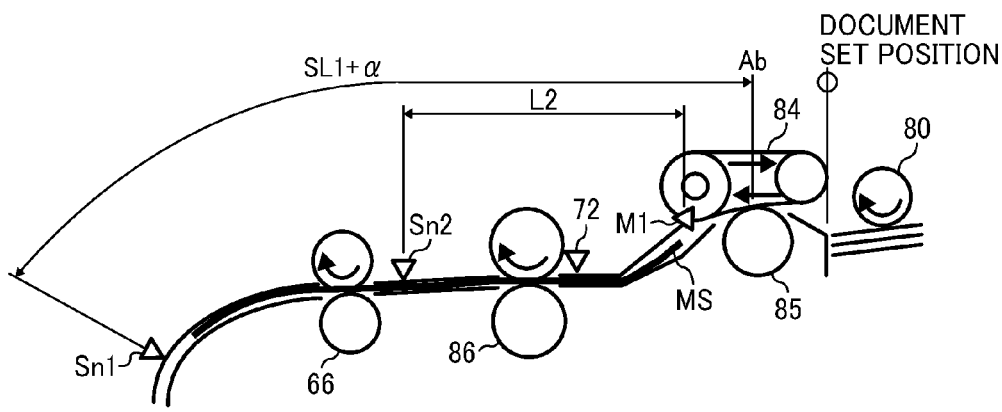
FIG. 17 illustrates conveyance of sheets shorter than a predetermined reference range and greater than a second conveyance distance from the trailing-edge detector to the second leading-edge detector.

With reference to FIGS. 13A, 13B, and 17, feeding control of the third and subsequent sheet in the case of "first size" is described below. The first size is shorter than the predetermined reference length and greater than the second conveyance distance L2 from the trailing-edge detector M1 to the second leading-edge detector Sn2.

At S12 in FIG. 13A, leading end detection by the leading-edge detectors Sn1 and Sn2 is made effective because the first size is shorter than the sheet length SL1.

The first sheet size is longer in the sheet conveyance direction than the second conveyance distance L2 (shown in FIG. 8). Accordingly, the leading edge of the first size sheet reaches the second leading-edge detector Sn2 before the trailing end thereof exits the trailing-edge detector M1 similarly to the specific sheet size. Accordingly, in the case of first size, descent of the pickup roller 80 is started in response to leading end detection by the second leading-edge detector Sn2. Accordingly, intervals between the first size sheets can be reduced compared with a method of descending the pickup roller 80 in response to trailing end detection by the trailing-edge detector M1.

However, as shown in FIG. 17, the trailing end of the first size sheet exits the trailing-edge detector M1 before the leading end thereof reaches the first leading-edge detector Sn1 because the first size is shorter than the above-described predetermined reference length. Accordingly, in the case of first size, feeding of the subsequent sheet is started in response to trailing end detection by the trailing-edge detector M1. With this control, intervals between first size sheets can be reduced compared with a method in which feeding of the subsequent sheet is started when the first leading-edge detector Sn1 detects the leading edge of the sheet.

Figure 18:
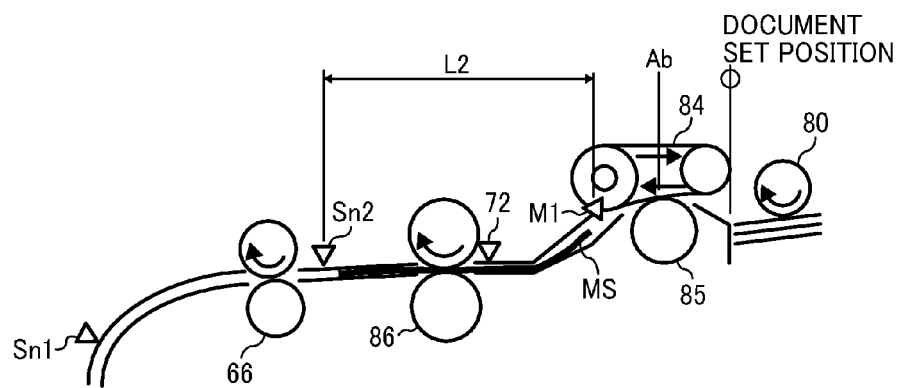
FIG. 18 illustrates conveyance of sheets shorter than the second conveyance distance from the trailing-edge detector to the second leading-edge detector.

With reference to FIGS. 13A, 13B, and 18, descriptions are given below of conveyance of "second size" sheets, which is shorter than the second conveyance distance L2 from the trailing-edge detector M1 to the second leading-edge detector Sn2 (second size<first size).

Although, at S12 in FIG. 13A, leading end detection is made effective in the case of the second size shorter than the sheet length SL1. However, as shown in FIG. 18, the trailing end of the second size sheet, which is shorter than the second conveyance distance L2, exits the trailing-edge detector M1 before the leading end thereof reaches the second leading-edge detector Sn2 (No at S15A and Yes at S16 in FIG. 13B). Accordingly, descent of the pickup roller 80 is started at (S17B in FIG. 13B) in response to trailing end detection by the trailing-edge detector M1. Then, conveyance of the subsequent sheet is started at S21 when descent of the pickup roller 80 is completed (Yes at S20). Thus, in the case of the second size, trailing end detection by the trailing-edge detector M1 triggers both the sheet feeding preparation and sheet feeding. Thus, intervals between sheets can be reduced compared with the method for the specific sheet size in which descent of the pickup roller 80 is started when the second leading-edge detector Sn2 detects the trailing edge of the sheet MS, and conveyance of the subsequent sheet is started when the first leading-edge detector Sn1 detects the leading edge of the sheet MS.

Descriptions are given below of conveyance of "third size" sheets longer than the sheet length SL1 (216 mm in the case of sideways letter size) with reference to FIGS. 13A, 13B, and 19. In this case, leading end detection by the leading-edge detectors Sn1 and Sn2 is disabled at S13.

Figure 19:
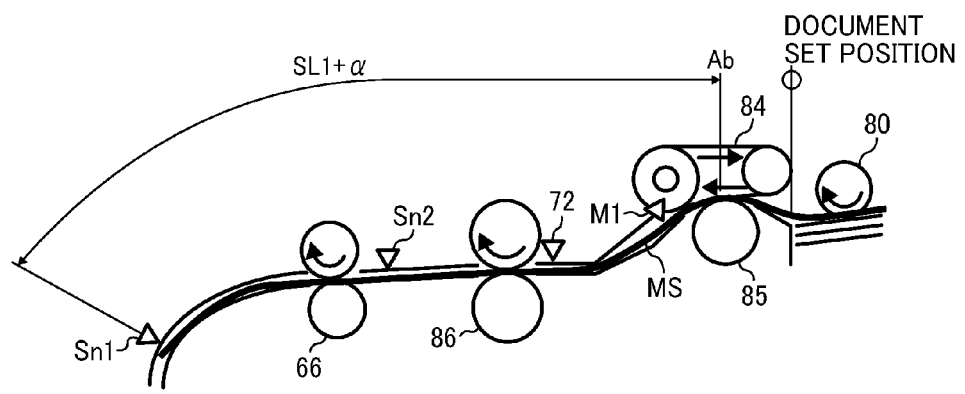
FIG. 19 illustrates a state in which a leading edge of a sheet longer than the specific sheet size at the first leading-edge detection.

As shown in FIG. 19, before the trailing-edge detector M1 detects the trailing edge of the sheet MS, the leading-edge detectors Sn1 and Sn2 detect the leading edge of the sheet MS. At that time, arrival of the sheet MS at the leading-edge detector Sn1 or Sn2 does not trigger descent of the pickup roller 80 or feeding of the subsequent sheet because leading end detection by the leading-edge detectors Sn1 and Sn2 is disabled (No at S15B). As shown in FIG. 19, when the leading edge thereof is at the first leading-edge detector Sn1, the trailing edge of the sheet MS has not yet passed by the pickup roller 80 but is upstream from the pickup roller 80. In this case, if descent of the pickup roller 80 is started when the second leading-edge detector Sn2 detects the leading edge of the sheet MS, the pickup roller 80 contacts the preceding sheet MS. As a result, the pickup roller 80 can hinder conveyance of the preceding sheet, skewing the preceding sheet. Moreover, if sheet conveyance is started when the first leading-edge detector Sn1 detects the leading edge of the sheet MS, multifeed can occur.

Therefore, in the case of third size greater than the specific sheet size, leading end detection is disabled, descent of the pickup roller 80 is started at S17B in response to detection of the trailing edge of the sheet MS by the trailing-edge detector M1 (Yes at S16), and conveyance of the subsequent sheet is started at S21 when the pickup roller 80 contacts the bundle of sheets MS (Yes at S20). With this control, the sheets MS can be fed without skewing or multifeed.

Thus, conveyance of the third and subsequent sheets is controlled as shown in FIG. 13B in the present embodiment.

Although the description above concerns the sheet conveyance mechanism used in the ADF 51, various aspects of the present embodiments can adapt to other sheet conveyance mechanisms such as the sheet feeder 40 to transport sheets from the sheet cassettes 42 to the secondary-transfer nip.

As described above, the sheet conveyance device according to the above-described embodiment includes the document table 53 (loading section) on which multiple sheets can be placed, the pickup roller 80 (sheet feeding unit) to transport the top sheet from the loading section, the separation section (conveyance belt 84 and reverse roller 85) to separate at a separation position (Ab) one by one the multiple sheets transported by the sheet feeding unit, the conveyance belt 84 (conveyance member) to transport the sheet separated by the separation section, the trailing-edge detector M1 to detect a trailing end of the sheet separated by the separation section, and the controller 100 to cause the sheet feeding unit to start sheet feeding at a predetermined timing.

The sheet conveyance device according to the above-described embodiment further includes the first leading-edge detector Sn1 to detect a leading edge of the sheet, at a position downstream from the trailing-edge detector M1, and the sheet size detector to detect the length in the sheet conveyance direction of the sheet being transported. The first leading-edge detector Sn1 is at the sum of the sheet length SL1 and the margin α downstream from the separation nip Ab. Accordingly, intervals between specific size sheets (SL1) can be as small as the margin α or less. It is to be noted that if the subsequent sheet projects from the separation nip Ab, intervals between sheets are smaller than the margin α.

The distance from the separation nip Ab to the trailing-edge detector M1 is referred to as the first conveyance distance L1.

When the detected length of the sheet in the sheet conveyance direction is equals to a predetermined reference length (within the range from specific sheet length SL1 minus the first conveyance distance L1 to the specific sheet length SL1), the controller causes the sheet feeding unit to start sheet feeding in response to detection of the leading edge of the sheet by the first leading-edge detector Sn1.

Thus, in conveyance of sheets having a length equal to the predetermined reference length, intervals between sheets can be reduced by starting conveyance of the subsequent sheet in response to leading end detection by the first leading-edge detector Sn1 similarly to the comparative sheet conveyance device.

By contrast, when the length of the sheet in the sheet conveyance direction is not the predetermined reference length, the controller 100 causes the sheet feeding unit to start sheet feeding in response to detection of the trailing end of the sheet by the trailing-edge detector M1. Thus, multifeed can be prevented, compared with a method in which feeding of the subsequent sheet is triggered by detection by the first leading-edge detector Sn1.

The trailing-edge detector M1 includes the rotary follower, such as the detection roller 141, that rotates as the sheet moves, and the rotation detector (the encoder wheel 143, the photosensor 144, and the controller 100) to detect rotation of the rotary follower.

The trailing-edge detector M1 is configured to recognize the presence or absence of the trailing edge of the sheet with rotation of the detection roller 141. Thus, passage of the trailing edge of the sheet can be recognized by monitoring rotation of the rotary follower (detection roller 141) because the rotary follower stops rotating when the sheet exits the trailing-edge detector M1. Compared with trailing-edge detectors using a photosensor, this configuration can detect passage of the trailing end of the sheet at the trailing-edge detector M1 promptly, thus restricting increases in intervals between sheets in conveyance of sheets having lengths other than the reference length.

Additionally, the rotary follower can keep rotating while punch holes formed on the sheet passes by the trailing-edge detector M1.

In this configuration, erroneous detection of the trailing edge of punched sheets does not occur even if it is deemed that the trailing edge has passed the trailing-edge detector in response to the rotary follower stopping rotation. Thus, when the trailing edge of the sheet has exited the trailing-edge detector M1, it can be recognized immediately. Thus, the trailing edge of the sheet can be detected earlier without erroneous detection.

Thus, regarding sheet lengths out of the predetermined reference length or range, when feeding the subsequent sheet is triggered by trailing end detection by the trailing-edge detector M1, intervals between sheets can be reduced compared with comparative sheet conveyance devices in which a photosensor is used in trailing end detection.

Instead of using a dedicated sheet length detector, the trailing-edge detector can be used to detect the sheet length.

When the sheet length is equal to and shorter than the specific sheet length SL1, either leading end detection by the leading-edge detector Sn1 or trailing end detection by the trailing-edge detector M1, which comes earlier is used to trigger sheet feeding. In the case of the specific sheet length SL1 and the reference length, leading end detection by the leading-edge detector Sn1 is earlier than the trailing end detection by the trailing-edge detector M1, and thus sheet conveyance is started in response to the leading end detection. In the case of sheet sizes shorter than the reference length (i.e., first and second sizes), trailing end detection by the trailing-edge detector M1 is earlier than leading end detection by the leading-edge detector Sn1, and thus sheet conveyance is started in response to the trailing end detection.

Additionally, the sheet feeding unit performs sheet feeding preparation (i.e., descent of the pickup roller 80) before starting sheet feeding, and a second leading-edge detector Sn2 is provided between the first leading-edge detector Sn1 and the trailing-edge detector M1. The second leading-edge detector Sn2 is disposed at a second conveyance distance L2 downstream from the trailing-edge detector in the sheet conveyance direction.

The sheet feeding unit includes a rotary member to rotate while being in contact with the top sheet of the multiple sheets set in the loading section. The sheet feeding preparation includes moving the rotary member until it contacts the top sheet.

When the detected sheet size is equal to or shorter than the specific sheet size (sheet length SL1), either leading end detection by the second leading-edge detector Sn2 or trailing end detection by the trailing-edge detector M1, which comes earlier is used to trigger sheet feeding preparation.

When it is detected that the sheet is longer than the second conveyance distance L2 and shorter than the sheet length SL1 (first size, specific sheet size, and reference length can be within this range), the controller 100 uses leading end detection by the second leading-edge detector Sn2 as a trigger for the sheet feeding preparation. When the length of the sheet is out of this range, the controller 100 uses trailing end detection by the trailing-edge detector M1 as the trigger for the sheet feeding preparation.

In the case of first size shorter than the sheet length SL1 and longer than the second conveyance distance L2, sheet feeding preparation is started in response to leading end detection by the second leading-edge detector Sn2, and the sheet feeding preparation can be completed earlier.

By contrast, in the case of second size sheets shorter than the second conveyance distance L2 (e.g., L2<SL1), sheet feeding preparation (descent of the pickup roller 80) is started in response to trailing end detection by the trailing-edge detector M1 so that the sheet feeding preparation can be completed earlier compared with the method in which the sheet feeding preparation is triggered by the leading end detection by the second leading-edge detector Sn2.

Thus, in the case of the first size, the specific sheet length SL1, and the reference length, the sheet feeding preparation can be started before the trailing-edge detector M1 detects the trailing edge of the sheet. Then, sheet feeding preparation can be completed earlier, that is, before trailing end detection by the trailing-edge detector M1. Accordingly, the subsequent sheet can be sent out earlier.

In the case of sheets longer than the specific sheet size SL1, starting sheet feeding preparation in response to trailing end detection by the trailing-edge detector M1 can prevent the sheet feeding unit from hindering conveyance of the preceding sheet. For example, the pickup roller 80 can be prevented from contacting the sheet being transported, thereby preventing skew.

The sheet conveyance device further includes a mode setter, such as the operation panel 108 and the controller 100, to select the mixed-size loading mode when a bundle of mixed size sheets different in length in the sheet conveyance direction is placed in the loading section. In the mixed-size loading mode, the sheet length is not detected (or not used as the above-described trigger although it is detected), and the controller causes the sheet feeding unit to start feeding the subsequent sheet in response to detection of the trailing end of the sheet by the trailing-edge detector.

In the case of a bundle of mixed size sheets, multifeed can occur if a sheet longer than the reference length is conveyed although the sheet length detector or the trailing-edge detector M1 deems the sheet length equal to the reference length, and accordingly leading end detection is enabled. The mixed-size loading mode can prevent such inconvenience.

Additionally, the controller 100 can serve as a defective conveyance determination unit to determine whether sheet conveyance is defective when sheet feeding is started in response to leading end detection by the leading-edge detector Sn1 or Sn2. When the amount by which the sheet is conveyed (sheet conveyance amount) after leading end detection by the leading-edge detector Sn1 or Sn2 reaches a reference amount before the trailing-edge detector M1 detects the trailing edge of the sheet, the sheet conveyance is deemed defective, and the controller 100 stops the sheet conveyance.

Leading end detection is used as the above-described trigger when the detected sheet length equals the reference sheet length. Therefore, the trailing-edge detector M1 should detect the trailing end of the sheet when or before the sheet conveyance amount reaches the reference amount after the leading edge of the sheet is detected. In other words, the sheet length should be longer than the reference length if the sheet conveyance amount exceeds the reference amount before the trailing edge of the sheet is detected. Accordingly, it can be deemed that the sheet conveyance control is improper due to erroneous setting or malfunction of the device. In such cases, sheet skewing or multifeed can be prevented by stopping sheet conveyance.

The sheet conveyance amount can be known based on the driving amount of driving sources such as the feed motor 102.

The sheet conveyance device further includes a report unit. When the defective conveyance determination unit deems sheet conveyance defective, the report unit reports it to a user and urges the user to check whether the mixed-size loading mode is selected. Additionally, when the sheet conveyance is deemed defective, the report unit may report to the user malfunction of the detector to detect the sheet length. This can facilitate identification of the causes of troubles.

Numerous additional modifications and variations are possible in light of the above teachings. It is therefore to be understood that, within the scope of the appended claims, the disclosure of this patent specification may be practiced otherwise than as specifically described herein.

What is claimed is:

1. A sheet conveyance device comprising:
   a loading section to accommodate multiple sheets stacked one on another;
   a sheet feeding unit disposed facing a top sheet of the multiple sheets set in the loading section to transport the top sheet from the loading section;
   a separation section disposed downstream in a sheet conveyance direction from the sheet feeding unit to separate at a separation position (Ab) one by one the multiple sheets transported by the sheet feeding unit;
   a conveyance member to transport the sheet separated by the separation section;
   a trailing-edge detector disposed downstream from the separation position (Ab) in the sheet conveyance direction to detect a trailing edge of the sheet, the trailing-edge detector including a rotary follower to rotate as the sheet moves, and a rotation detector to detect rotation of the rotary follower;
   a first leading-edge detector disposed downstream from the trailing-edge detector to detect a leading edge of the sheet; and
   a controller to cause the sheet feeding unit to start sheet feeding at a predetermined timing,
   wherein a length of the sheet in the sheet conveyance direction is detected by the trailing-edge detector,
   when the length of the sheet in the sheet conveyance direction detected by the trailing-edge detector equals a predetermined reference length, the controller causes the sheet feeding unit to start sheet feeding in response to detection of the leading edge of the sheet by the first leading-edge detector, and
   in other cases the controller causes the sheet feeding unit to start sheet feeding in response to detection of the trailing edge of the sheet by the trailing-edge detector.

2. The sheet conveyance device according to claim 1, wherein the trailing-edge detector is disposed at a first conveyance distance (L1) from the separation position (Ab), and
   the predetermined reference length is equals to or shorter than a specific sheet length (SL1) and greater than a length obtained by deducting the first conveyance distance (L1) from the specific sheet length (SL1).

3. The sheet conveyance device according to claim 2, further comprising a second leading-edge detector disposed upstream from the first leading-edge detector and at a second conveyance distance (L2) downstream from the trailing-edge detector in the sheet conveyance direction, wherein the sheet feeding unit performs sheet feeding preparation before starting sheet feeding, when the trailing-edge detector detects that the length of the sheet is equal to or shorter than the specific sheet length (SL1) and equal to or greater than the second conveyance distance (L2), the controller uses detection of the leading edge of the sheet by the second leading-edge detector as a trigger for the sheet feeding preparation, and in other cases the controller uses detection of the trailing edge of the sheet by the trailing-edge detector as the trigger for the sheet feeding preparation.

4. The sheet conveyance device according to claim 3, wherein the sheet feeding unit comprises a rotary member to rotate on the top sheet of the multiple sheets set in the loading section, and the sheet feeding preparation comprises moving the rotary member of the sheet feeding unit until the rotary member contacts the top sheet.

5. The sheet conveyance device according to claim 3, when the sheet feeding preparation is triggered by detection of the trailing edge of the sheet by the trailing-edge detector, the controller causes the sheet feeding unit to start sheet feeding when the sheet feeding preparation is completed.

6. The sheet conveyance device according to claim 3, wherein, when the length of the sheet in the sheet conveyance direction is not greater than the specific sheet length (SL1), the controller uses, as the trigger for the sheet feeding preparation, either detection of the leading edge of the sheet by the second leading-edge detector, or detection of the trailing edge of the sheet by the trailing-edge detector, whichever is earlier.

7. The sheet conveyance device according to claim 1, wherein, when the detected length of the sheet in the sheet conveyance direction is shorter than the predetermined reference length, the controller causes the sheet feeding unit to start sheet feeding in response to either detection of the leading edge of the sheet by the first leading-edge detector, or detection of the trailing edge of the sheet by the trailing-edge detector, whichever is earlier.

8. The sheet conveyance device according to claim 1, further comprising a defective conveyance determination unit to determine whether sheet conveyance is defective, wherein the defective conveyance determination unit performs defective conveyance detection when the sheet feeding is started in response to detection of the leading edge of the sheet by the first leading-edge detector, and when a conveyance amount of the sheet after the first leading-edge detector detects the leading edge thereof reaches a reference amount before the trailing-edge detector detects the trailing edge of the sheet, the defective conveyance determination unit deems sheet conveyance defective, and the controller stops sheet conveyance.

9. The sheet conveyance device according to claim 8, wherein the conveyance amount of the sheet is obtained based on a driving amount of a driving source to drive the sheet feeding unit.

10. The sheet conveyance device according to claim 8, further comprising:

a mode setter to select a mixed-size loading mode when a bundle of mixed size sheets different in length in the sheet conveyance direction is placed in the loading section; and a report unit, wherein, when the defective conveyance determination unit deems the sheet conveyance defective, the report units reports to a user that the sheet conveyance is defective and urges the user to check whether the mixed-size loading mode is selected.

11. The sheet conveyance device according to claim 8, further comprising a report unit to report to a user that detection of the sheet length by the trailing-edge detector is erroneous.

12. The sheet conveyance device according to claim 1, further comprising a mode setter to select a mixed-size loading mode when a bundle of mixed size sheets different in length in the sheet conveyance direction is placed in the loading section, wherein, in the mixed-size loading mode, the controller causes the sheet feeding unit to start feeding the subsequent sheet in response to detection of the trailing edge of the sheet by the trailing-edge detector without detecting the length of the sheet.

13. An image forming apparatus comprising:

a image forming unit to form an image on a sheet of recording media; and the sheet conveyance device according to claim 1.

14. An image reading device comprising:

a reading unit to read image data of an original document; and a sheet conveyance device to transport the original document, the sheet conveyance device comprising:

a loading section to accommodate multiple original documents stacked one on another;

a sheet feeding unit disposed facing a top sheet of the multiple original documents set in the loading section to transport the top sheet from the loading section;

a separation section disposed downstream in a sheet conveyance direction from the sheet feeding unit to separate at a separation position (Ab) one by one the multiple original documents transported by the sheet feeding unit;

a conveyance member to transport the original document separated by the separation section;

a trailing-edge detector disposed downstream from the separation position (Ab) in the sheet conveyance direction to detect a trailing edge of the original document, the trailing-edge detector including a rotary follower to rotate as the original document moves, and a rotation detector to detect rotation of the rotary follower;

a first leading-edge detector disposed downstream from the trailing-edge detector to detect a leading edge of the original document; and a controller to cause the sheet feeding unit to start sheet feeding at a predetermined timing, wherein a length of the original document in the sheet conveyance direction is detected by the trailing-edge detector, when the length of the original document in the sheet conveyance direction detected by the trailing-edge detector equals a predetermined reference length, the controller causes the sheet feeding unit to start sheet feeding in response to detection of the leading edge of the original document by the first leading-edge detector, and in other cases the controller causes the sheet feeding unit to start sheet feeding in response to detection of the trailing edge of the original document by the trailing-edge detector.

15. An image forming apparatus comprising:

a image forming unit to form an image on a sheet of recording media; and the image reading device according to claim 14.

16. A sheet conveyance device comprising:
a loading section to accommodate multiple sheets stacked one on another;
a sheet feeding unit disposed facing a top sheet of the multiple sheets set in the loading section to transport the top sheet from the loading section;
a separation section disposed downstream in a sheet conveyance direction from the sheet feeding unit to separate at a separation position (Ab) one by one the multiple sheets transported by the sheet feeding unit;
a conveyance member to transport the sheet separated by the separation section;
a trailing-edge detector disposed downstream from the separation position (Ab) in the sheet conveyance direction to detect a trailing edge of the sheet, the trailing-edge detector including a rotary follower to rotate as the sheet moves, and a rotation detector to detect rotation of the rotary follower;
a first leading-edge detector disposed downstream from the trailing-edge detector to detect a leading edge of the sheet;
a sheet length detector to detect a length of the sheet in the sheet conveyance direction; and
a controller to cause the sheet feeding unit to start sheet feeding at a predetermined timing,
wherein, when the length of the sheet in the sheet conveyance direction detected by the sheet length detector equals a predetermined reference length, the controller causes the sheet feeding unit to start sheet feeding in response to detection of the leading edge of the sheet by the first leading-edge detector, and
in other cases the controller causes the sheet feeding unit to start sheet feeding in response to detection of the trailing edge of the sheet by the trailing-edge detector.

* * * * *